(12) United States Patent
Morgan et al.

(10) Patent No.: US 11,399,097 B2
(45) Date of Patent: Jul. 26, 2022

(54) SYSTEMS AND METHODS FOR SEARCH BASED CALL ROUTING

(71) Applicant: FMR LLC, Boston, MA (US)

(72) Inventors: David Peter Morgan, Lexington, MA (US); Prateek Nayak, Gandhinagar (IN); Shivam Sharma, Kanpur (IN); Jordan Levesque, Brookline, NH (US); Logeshwaran Vidhyasagar, Tiruvallur (IN); Daniel Lee, Carollton, TX (US); Sridhar Duddala, Frisco, TX (US); Emi Choraria, Chennai (IN)

(73) Assignee: FMR LLC, Boston, MA (US)

(*) Notice: Subject to any disclaimer, the term of this patent is extended or adjusted under 35 U.S.C. 154(b) by 0 days.

(21) Appl. No.: 17/317,196

(22) Filed: May 11, 2021

(65) Prior Publication Data

US 2021/0266406 A1    Aug. 26, 2021

Related U.S. Application Data

(63) Continuation-in-part of application No. 16/941,274, filed on Jul. 28, 2020, now Pat. No. 11,025,780.

(60) Provisional application No. 62/882,379, filed on Aug. 2, 2019.

(51) Int. Cl.
| | |
|---|---|
| H04M 3/523 | (2006.01) |
| H04M 3/51 | (2006.01) |
| H04M 3/42 | (2006.01) |
| H04M 3/493 | (2006.01) |

(52) U.S. Cl.
CPC ..... *H04M 3/5233* (2013.01); *H04M 3/42382* (2013.01); *H04M 3/4933* (2013.01); *H04M 3/5175* (2013.01); *H04M 3/5237* (2013.01); *H04M 3/5238* (2013.01)

(58) Field of Classification Search
CPC .......... H04M 3/5233; H04M 3/42382; H04M 3/4933; H04M 3/5175; H04M 3/5237; H04M 3/5238
USPC ...................................... 379/265.12
See application file for complete search history.

(56) References Cited

U.S. PATENT DOCUMENTS

| | | | |
|---|---|---|---|
| 6,560,330 B2 | 5/2003 | Gabriel | |
| 6,823,054 B1 | 11/2004 | Suhm et al. | |
| 2002/0114278 A1* | 8/2002 | Coussement | ....... H04M 7/0069 709/224 |
| 2014/0365520 A1* | 12/2014 | Pujare | ..................... G06F 16/22 707/769 |
| 2015/0264180 A1* | 9/2015 | Wolthuis | ............. H04M 3/5175 379/265.12 |

(Continued)

*Primary Examiner* — Ahmad F. Matar
*Assistant Examiner* — Jirapon Intavong
(74) *Attorney, Agent, or Firm* — Proskauer Rose LLP

(57) ABSTRACT

A computerized method of routing customer interactions (call and chats) includes the following steps performed by a server computing device: creating a database with a document for every agent with a set of attributes identifying the types of customer interactions they service, receiving a set of call attributes associated with an incoming call; formulating a query of the call attributes against all agent profiles and returning a matching score for all available agents using Elastic Search; and routing the incoming call to a target agent with the highest score in the set of available agents, if there is at least one available agent; or a customer waiting queue, if there is no suitable agent achieving at least a minimum score.

20 Claims, 30 Drawing Sheets

(56) References Cited

U.S. PATENT DOCUMENTS

| | | | |
|---|---|---|---|
| 2015/0379013 A1* | 12/2015 | Purcell | G06F 16/3329 707/755 |
| 2017/0111507 A1* | 4/2017 | McGann | G06N 20/00 |
| 2017/0161375 A1* | 6/2017 | Stoica | G06F 16/353 |

* cited by examiner

```
{
    "Ixn Type Rule":"DT-118a",
    "Label":"FI INTL SS and SS TOA",
    "Ixn_Type":"INTL_STLMNTS_NF",
    "Call_Type":"INTL STLMNTS NF",
    "Hours_Of_Operation":"xxx",
    "Treatment_Rule":"Rule-116",
    "Target_Rule":"Rule-121",
    "Rule-121":{
        "Skill":"FI_OSG_INTL_STLMNT_NF",
        "Ixn_Priority":"1"
    },
    "Orig_DN":"8667556372",
    "RepToRep String is":"ARROSGINTSTLMTNF",
    "IVR Prompt":[
        "NT430E",
        "CL_ST_International"
    ]
}
```
— 310

FIG. 3A

```
A123101 FI_OSG_INTL_STLMNT_NF:6, FI_OSG_INTL_STLMNT_SS:4,
A123102 FI_OSG_INTL_STLMNT_NF:8, FI_OSG_SS_TOA_REC:4,
A123103 FI_OSG_INTL_STLMNT_NF:4,
FI_OSG_SS_TOA_DEL_ACAT:2
                                                    320
```

FIG. 3B

```
{
  "Ixn Type Rule": 23,
  "Label": "IXaxWD",
  "Ixn_Type": "someLabel23",
  "Call_Type": "call type6",
  "Hours_Of_Operation": "8-5",
  "Treatment_Rule": 291,
  "Target_Rule": "RULE-4",
  "Orig_DN": 6371323648,
  "RepToRep String is": "Some Rep to Rep string",
  "IVR Prompt": [
   6
  ],
  "RULE-4": {
    "Skill": "Skill2",
    "Ixn_Priority": 1,
    "Start_Prof": 2,
    "Target_Expansion": "4,6,8,10"
                                                    — 330
  }
}
```

FIG. 3C

```
query = {
  "size": 25,
  "query": {
    "bool": {
      "must": { "match": { "Orig_DN: orig_dn }},
      "should: [
        { "match": { "RepToRep String is": rep_to_rep }},
        { "match": { "IVR Prompt": ivr_prompt_str }}
      ]
    }
  }
}
```

| contactId 0 | call_time_stamp | operand | priority | prof | skill | timeout |
|---|---|---|---|---|---|---|
| abcdefg-1234-5678-1234-abcdefghij | 1588232270 | eq | 3 | 10 | Skill_B | 9999 |

| contactid | call_time_stamp | operand | priority | pool | skill | timeout | agent_assigned |
|---|---|---|---|---|---|---|---|
| abcdefg-1234-5678-1234-abcdefghi | 1580273270 | an | 3 | 10 | Skill_B | 9999 | AgentB |

| username | Skill_A | Skill_B | instanceid | onlineTimestamp | status | userid |
|---|---|---|---|---|---|---|
| AgentA | 4 | 4 | abcde-fghijk | 1588067196 | Ready | 12345-98765 |
| AgentB | 8 | 10 | abcde-fghijk | 1588067196 | Busy | 989997-98765 |

| Rule_Name | Rule_Description | Rule_Phase |
|---|---|---|
| Main Open Closed | Branches which behave normally during DST | OpenClosed |
| Main Xfr Open Closed | Transfers which behave normally during DST | OpenClosed |
| AZ DST Main Open Closed | Main which adjust for DST - DO NOT DELETE reset each year for DST | OpenClosed |
| AZ DST Xfr Open Closed | Transfers which adjust for DST - DO NOT DELETE | OpenClosed |
| AZ DST Main Open Closed-MST | Main which adjust for DST - DO NOT DELETE reset each year for DST | OpenClosed |
| AZ DST Xfr Open Closed-MST | Transfers which adjust for DST - DO NOT DELETE | OpenClosed |
| Queue Targeting | Targeting for all queue calls | Target Selection |
| Xfr Targeting | Targeting for all transfers | Target Selection |
| General Treatments | Prompter file to opt out of queue | Treatments |
| Xfr Treatments | Xfrs only get queue music, no prompts | Treatments |
| Orig DN Mapping | Mapping between the Orig DN and Ixn Type | Ixn Type |
| Orig DN Mapping | Mapping between the Orig DN and Ixn Type | Ixn Type |
| Orig DN Mapping | Mapping between the Orig DN and Ixn Type | Ixn Type |
| Orig DN Mapping | Mapping between the Orig DN and Ixn Type | Ixn Type |
| Orig DN Mapping | Mapping between the Orig DN and Ixn Type | Ixn Type |

FIG. 12

```
{
    "_index": "agentroutingdata",
    "_type": "agentrountingdata",
    "_id": "2QrmFHYBjtvH838-Jb9F",
    "_version": 1,
    "_score": 1,
        "_score": {
            "Agent_CorpID": "a654321",
            "Agent_Status": "Available",
            "Agent_Status_Timestamp": 1606667967,
            "Dialed_Number": "8005551213",
            "Appointment_Type": "Cancel",
            "Customer_Value": "higher",
            "Language_English": true,
            "Language_Spanish": false,
            "Customer_Online": true
        }
}
```
— 1710

FIG. 17A

```
{
    "_index": "agentroutingdata",
    "_type": "agentrountingdata",
    "_id": "1wrmFHYBjtvH838-Jb85",
    "_version": 1,
    "_score": 1,
        "_score": {
            "Agent_CorpID": "a123456",
            "Agent_Status": "Available",
            "Agent_Status_Timestamp": 1606667467,
            "Dialed_Number": "8005551213",
            "Appointment_Type": "New",
            "Customer_Value": "higher",
            "Language_English": true,
            "Language_Spanish": true,
            "Customer_Online": true
        }
}
```
1720

FIG. 17B

```
{
  "size":3,
  "query":{
    "bool":{
      "must":[
        {"match":{"Agent_status":{"query":"Available"}}},
        {"match":{"Dialed_Number":{"query":"#0055I213"}}},
        {"match":{"Appointment_Type":{"query":"Cancel"}}},
        {"match":{"Customer_value":{"query":"highest"}}},
        {"match":{"Language_English":{"query":true}}},
        {"match":{"Language_Spanish":{"query":false}}},
        {"match":{"Customer_Online":{"query":true}}}
      ],
      "must_not":[
        {"match":{"Agent_status":"Busy"}},
        {"match":{"Agent_status":"Not Ready"}}
      ]
    }
  },
  "sort":[
    {"Agent_status_timestamp":{"order":"desc"}}
  ]
}
```

SYSTEMS AND METHODS FOR SEARCH BASED CALL ROUTING

CROSS REFERENCE TO RELATED APPLICATION

This application is a continuation-in-part of patent application Ser. No. 16/941,274, filed on Jul. 28, 2020, which claims the benefit of and priority to U.S. Provisional Patent No. 62/882,379, filed on Aug. 2, 2019, the entire contents of which are owned b the assignee of the instant application and incorporated herein by reference in their entirety.

TECHNICAL FIELD

The invention relates generally to methods and systems, including computer programs, for routing customer calls to agents (e.g., in call centers). More specifically, the invention relates to methods and systems for selecting agents to answer customer queries based at least in part on agent proficiency in one or more relevant skill areas.

BACKGROUND

Call centers help companies resolve a wide variety of their customers' service needs. Today, most call centers use an automated computer interface, such as an interactive voice response (IVR) system, to conduct at least initial interactions with customers, e.g., by playing pre-recorded messages and receiving spoken answers or touch tone phone selections back from customers, prior to determining whether to route a call to a human agent. This approach can reduce the need to utilize human agent time, such as by answering easy or frequently asked questions with automated responses, and can help efficiently collect basic information about the call to assist the agent in resolving the customer's issue, if an agent is in fact needed. In such a case, the call is placed into a wait queue and is eventually routed to an available agent.

Skills-based call routing is used in contact centers to assign incoming calls to the most appropriately skilled agent to service the call, instead of simply choosing the next available agent or assigning the call to a queue. This strategy allows contact centers to designate agents as specialists in certain products or services by indicating an agent's proficiency in each skill. The need for skills-based routing has arisen as contact centers offer more specialized services and provide higher levels of service to high-value callers. With skills-based routing, the skill and proficiency needed to service a particular call can be determined by call-associated data, including the dialed telephone number, the caller's identity, caller attributes, and selections made during the IVR intake process to understand caller's intent. The call associated data is typically referred to as "Key Value Pairs" (KVPs) with values that are associated with specific call variables. A skills-based routing system can include a set of routing rules that utilizes the KVPs to attempt to match the call to a suitably trained agent in an available state before expanding the routing to less optimally skilled agents.

However, such call routing technology has developed largely without any standards for interoperability. Today, most solutions are vendor-specific and can involve thousands of custom-designed routing rules. This state of affairs can lead to high integration costs, particularly if a change in vendors is desired after a complex rules-based scheme is already developed within one proprietary solution. It would therefore be desirable to provide a technology that reduces or eliminates such costs and provides a simple and effective multi-vendor skills-based routing solution.

SUMMARY

The invention includes methods and systems that can dynamically and intelligently route calls (e.g., within a call center). A search function (e.g., Amazon Web Services (AWS) Elastic Search) can be used to match attributes of incoming calls to a database of documents (e.g., JSON documents) including comparable call attributes and target agent skills. A routing solution can be built by using a word matching algorithm within a search function (e.g., AWS Elastic Search or another Lucene-based search) to return agent skills corresponding to documents having the best matching scores according to pre-specified criteria.

In one exemplary AWS implementation, the invention has been built for the Genesys Engage premise solution and the Amazon Connect cloud-based contact center. Several (e.g., hundreds of) JSON documents can be formulated to include call associated data values (e.g., KVPs), target agent skills, and/or required proficiency levels in each skill. The JSON documents can be loaded into an Elastic Search (ES) index. AWS lambda functions can be used to query ES with call associated data (as can, for example REST APIs from Genesys). One lambda function can be called from a Connect call flow to query ES with a given set of call attributes. The resulting agent skill can be returned. The agent skill can be searched against one or more databases including agent skills, proficiencies and statuses. An agent in a ready status having a desired proficiency (e.g., a high proficiency for a premium customer, or a lower proficiency for a core customer) can then be targeted with the call, with the call placed directly to that agent or designated to that agent's queue.

In some embodiments, each inbound call and its associated KVPs can be sent to ES to return a list of agent skills to target with a corresponding relevance score. Each call can then be routed to the skill with the highest relevance score. In this manner, instead of calls being serviced strictly in the order of their arrival, calls can be serviced as agents with appropriate skills become available. The ES domain can be hosted on AWS, which itself can be accessible via secure REST APIs. Since these rules can be exposed via secure REST APIs, any contact center solution can use ES, making it vendor-agnostic and allowing users to build their own JSON-based routing strategies. In this way, a routing strategy can be executed in ES, and the results can be returned to the proprietary contact center solution, which can then direct the call to the selected agent.

In one aspect, there is a system for routing calls. The system includes a server computing device comprising a memory to store computer-executable instructions and a processor that executes the computer-executable instructions. The server computing device receives, from a contact center, a set of attributes for an incoming call. The server computing device searches, using an elastic search function and word matching criteria, an elastic search index to find a match (e.g., the best match) of the call attributes as compared with the attributes included in the elastic search index (e.g., contained in JSON documents). A conditional search may be used, which can include "must" and/or "should" match conditions applied to each attribute. The server computing device receives, from the elastic search database, a document (e.g., a JSON document) that meets (e.g., best meets) the word matching criteria for the set of attributes presented. The server computing device searches an agent skills database, in electronic communication with the server computing device, to identify a set of agents having the skill and a suitable proficiency in the skill (e.g., as specified in the JSON document) returned from the elastic search function. The server computing device searches an agent status database to identify an agent status (e.g., ready or occupied). If one or more agents are identified, the server computing device: (i) selects a target agent based on length of availability, (ii) sets a status of the target agent to busy, and (iii) routes the call to the target agent (e.g., to a queue of the target agent). If no agents are identified, the server computing device (i) checks to see if any agents are staffed; (ii) writes call attributes to the call attribute (or KVP) database; (iii) returns a call treatment rule to Connect call flow; and (iv) routes the call to a customer waiting queue.

In another aspect, there is a computerized method of routing calls. The method can include the following steps. First, a server computing device receives, from a contact center, a set of attributes for an incoming call. Second, the server computing device searches, using an elastic search function and word matching criteria, an elastic search index to find a match (e.g., the best match) of the call attributes as compared with the attributes included in the elastic search index (e.g., contained in JSON documents). A conditional search may be used, which can include "must" and/or "should" match conditions applied to each attribute. Third, the server computing device receives, from the elastic search database, a document (e.g., a JSON document) that meets (e.g., best meets) the word matching criteria for the set of attributes presented. Fourth, the server computing device searches an agent skills database, in electronic communication with the server computing device, to identify a set of agents having the skill and a suitable proficiency in the skill (e.g., as specified in the JSON document) returned from the elastic search function. Fifth, the server computing device searches an agent status database to identify an agent status (e.g., ready or occupied). If one or more agents are identified, the server computing device: (i) selects a target agent based on length of availability, (ii) sets a status of the target agent to busy, and (iii) routes the call to the target agent (e.g., to a queue of the target agent). If no agents are identified, the server computing device (i) checks to see if any agents are staffed; (ii) writes call attributes to the call attribute (or KVP) database; (iii) returns a call treatment rule to Connect call flow; and (iv) routes the call to a customer waiting queue.

In one aspect, the invention features a computerized method of routing calls. A server computing device receives a set of call attributes associated with an incoming call. The server computing device identifies a call routing instruction document corresponding to the call attributes by querying, using a text-based first matching criteria, a search index in electronic communication with the server computing device. The server computing device identifies, based on the returned document, a set of suitable agents having a skill and a suitable proficiency in the skill by querying, using second matching criteria, an agent skills database in electronic communication with the server computing device. The server computing device identifies a set of available agents in the set of suitable agents by querying, using third matching criteria, an agent status database in electronic communication with the server computing device. The server computing device routes the incoming call to: (i) a target agent in the set of available agents, if there is at least one available agent; or (ii) or a customer waiting queue, if there is no suitable agent in the set of available agents.

The above aspect can include one or more of the following features. In some embodiments, if one or more suitable agents are identified: the server computing device selects a target agent based at least in part on a on length of availability; sets a status of the target agent to busy; and routes the call to the target agent; or if no agents are identified: the server computing device determines whether any agents are staffed; writes call attributes to a call attribute database in electronic communication with the server computing device; and returns a call treatment rule for treating the incoming call while in the customer waiting queue.

In some embodiments, the first matching criteria include at least one required condition or at least one preferred condition. In some embodiments, identifying the document includes scoring the available documents in the search index and selecting the document having the highest relevance score. In some embodiments, the call attributes include at least a dialed phone number, and one or more caller selections made during an IVR selection process, customer originating phone number (ANI) and call arrival time. In some embodiments, the call attributes include at least a unique identifier of the caller, a skill, a skill level, a target expansion rule, a call queue time, and a call priority.

In some embodiments, the document is a JSON document. In some embodiments, the document includes at least an agent target rule and a call treatment rule. In some embodiments, the agent target rule includes a desired agent skill, an initial desired agent proficiency, and an optional target expansion rule. In some embodiments, the target expansion rule includes (i) searching a skill level above/below a first proficiency target for a first period of time, and (ii) if no agent becomes available during the first period of time, searching a skill level above/below a second proficiency target for a second period of time, wherein the second proficiency target is lower/higher than the first proficiency target. In some embodiments, the call treatment rule includes a prompt or a recording to present to a customer in the customer waiting queue.

In some embodiments, routing the incoming call further includes selecting a routing rule based on pre-specified ranking criteria in the event that there are no agents logged in to take calls with the highest ranking routing rules. In some embodiments, the documents include one or more call associated data values. In some embodiments, the incoming call has one or more associated key value pairs (KVPs) that the server computing device is configured to send to the search index to determine a set of agent skills to target. In some embodiments, each agent skill in the set of routing rule documents has a relevance score. In some embodiments, the incoming call is routed to the agent having the desired proficiency in the skill having the highest relevance score.

In some embodiments, the search index is accessible via one or more secure representational state transfer (REST) application programming interfaces (APIs). In some embodiments, the search index is accessible by more than one contact center or vendor. In some embodiments, the server computing device (i) performs a speech-to-text operation on speech received during the incoming call, thereby generating a text file, and (ii), generates, based on the text file, one or more key value pairs (KVPs) associated with the incoming call.

In some embodiments, when an agent enters a ready state, the server computing device queries a call attribute database to determine whether any calls in the customer waiting queue match the newly available agent's skills. In some embodiments, if more than one call in the customer waiting queue are returned, targeting the call that has the highest priority, or as a secondary measure, has been in the customer waiting queue for the longest time.

The invention, in another aspect, features a system for routing calls. The system comprises a server computing device comprising a memory to store computer-executable instructions and a processor that executes the computer-executable instructions. The server computing device receives a set of call attributes associated with an incoming call. The server computing device identifies a document corresponding to the call attributes by querying, using text based first matching criteria, a search index in electronic communication with the server computing device. The server computing device identifies, based on the returned document, a set of suitable agents having a skill and a suitable proficiency in the skill by querying, using second matching criteria, an agent skills database in electronic communication with the server computing device. The server computing device identifies a set of available agents in the set of suitable agents by querying, using third matching criteria, an agent status database in electronic communication with the server computing device. The server computing device routes the incoming call to: (i) a target agent in the set of available agents, if there is at least one available agent; or (ii) or a customer waiting queue, if there is no suitable agent in the set of available agents.

The above aspect can include one or more of the following features. In some embodiments, the system includes a contact center in electronic communication with the server computing device. In some embodiments, the system includes a representational state transfer (REST) application programming interface (API) in electronic communication with the server computing device. In some embodiments, the system includes a call attribute database in electronic communication with the server computing device, an agent skills database in electronic communication with the server computing device, and an agent status database in electronic communication with the server computing device.

In some embodiments, the server computing device includes a contact center call flow function. In some embodiments, the server computing device includes a text-based search function. In some embodiments, the server computing device includes a document database for storing documents representing call routing rules. In some embodiments, the server computing device includes a real-time data processing function configured to monitor when agents become available. In some embodiments, the server computing device includes multiple software application functions for looking up key value pair (KVP) values in the search index, selecting an agent, storing KVPs, selecting a call, and targeting a call.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 3A is an illustration of a JSON document, according to an illustrative embodiment of the invention.

FIG. 3B is an illustration of an agent skills and proficiency data segment of the JSON document, according to an illustrative embodiment of the invention.

FIG. 3C is an illustration of a rule segment component of the JSON document, according to an illustrative embodiment of the invention.

FIG. 3D is an illustration of a search query, according to an illustrative embodiment of the invention.

FIGS. 11A-11C are exemplary database entries written, according to an illustrative embodiment of the invention.

FIG. 12 is an exemplary segment of Elastic Search routing rules, according to an illustrative embodiment of the invention.

FIG. 17A is an illustration of an agent JSON document, according to an illustrative embodiment of the invention.

FIG. 17B is an illustration of an agent JSON document, according to an illustrative embodiment of the invention.

FIG. 17C is an illustration of a search query, according to an illustrative embodiment of the invention.

DETAILED DESCRIPTION

Figure 1:
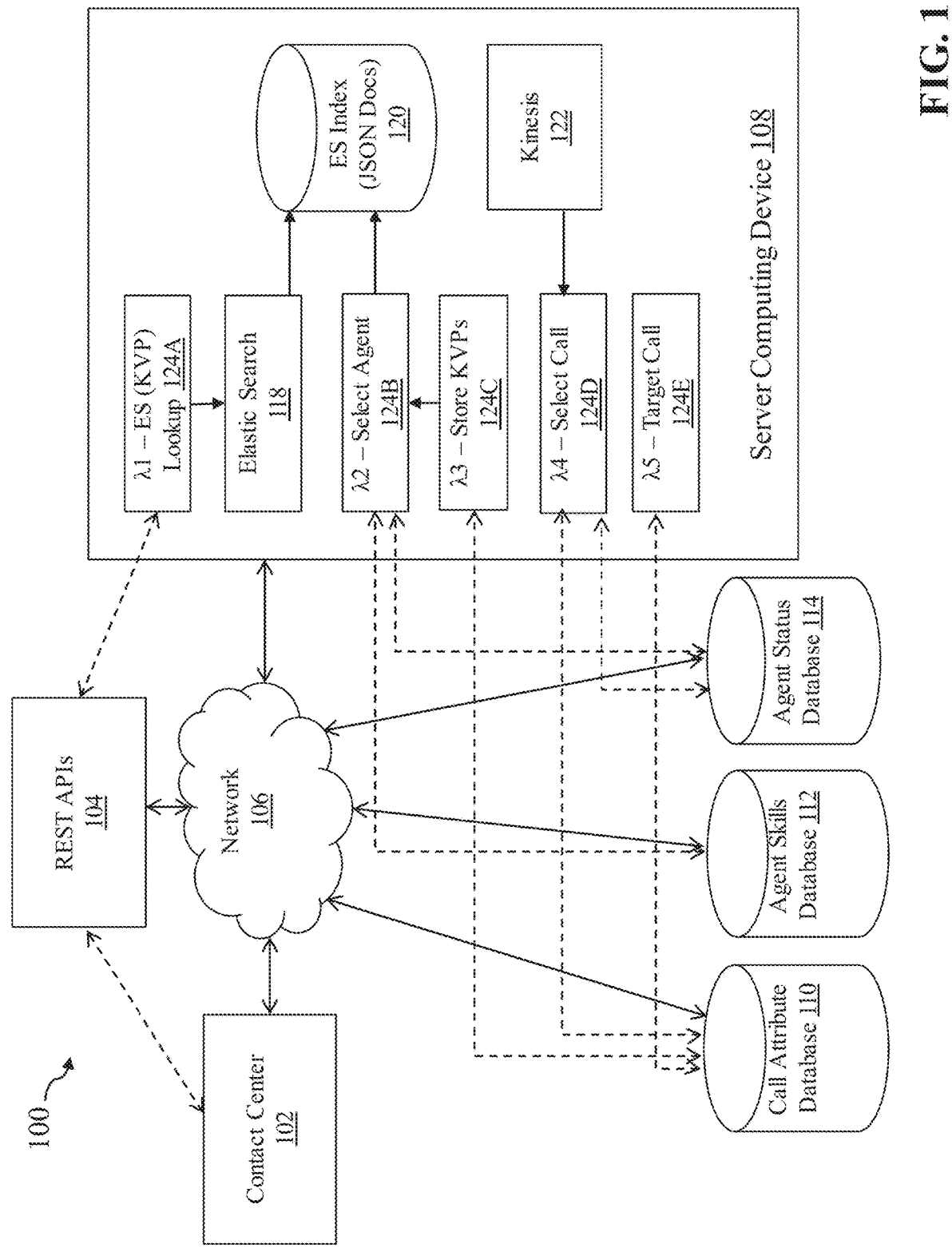
FIG. 1 is a block diagram of a system for routing calls, according to an illustrative embodiment of the invention.

FIG. 1 is a block diagram of a system 100 for routing calls, according to an illustrative embodiment of the invention. The system 100 includes a contact center 102 (such as Genesys or Connect) with a call flow function, a REST API 104 to expose the computing service, a network 106 (e.g., an electronic communications network), a server computing device 108, a call attribute (e.g., key value pair (KVP)) database 110, an agent skills database 112, and an agent status database 114. The server computing device 108 includes a search function 118 (e.g., Amazon Elastic Search), a document database 120 for storing documents representing call routing rules (e.g., an AWS managed Elastic Search domain leveraging EC2 for storing JSON documents), a real-time data processing function 122 (e.g., AWS Kinesis), and five software application functions (e.g., AWS lambda functions), 124A, 124B, 124C, 124D, 124E for looking up KVP values in ES, selecting an agent, storing KVPs, selecting a call, and targeting a call, respectively, as described in greater detail below. Document database 120 can be internal or external to the server computing device 108.

The contact center 102 initially answers the customer's call and performs call flow functions such as playing automated, pre-recorded prompts, collecting information about the purpose of the call, and/or authenticating the customer. The contact center 102 connects to the server computing device 108 via the network 106. The network 106 can be a wide area network, such as the Internet and/or a cloud network. In some embodiments, the network 106 is comprised of several discrete networks and/or sub-networks (e.g., cloud to Internet). The server computing device 108 can be a device including specialized hardware and/or software modules that execute on a processor and interact with memory modules of the server computing device 108, to receive data from other components of the system 100, transmit data to other components of the system 100, and perform functions for call routing as described herein.

The databases 110, 112, 114 are computing devices (or in some embodiments, all one computing device, or each a set of computing devices) coupled to the server computing device 108 and are configured to receive, generate, and store specific segments of data as described herein. In some embodiments, all or a portion of the databases 110, 112, 114 can be integrated with the server computing device 108 or be located on a separate computing device or devices. The databases 110, 112, 114 can each comprise one or more databases configured to store portions of data used by the other components of the system 100. As shown in FIG. 1, the system comprises a call attribute database 110, an agent skills database 112, and an agent status database 114. It should be appreciated that, in some embodiments, the agent skills database 112 and the agent status database 114 can be consolidated into a single database (e.g., an agent configuration database).

In one embodiment, call associated data values (e.g., KVPs) and target agent skills can be formulated into routing rules and expressed as JSON documents and loaded into an Elastic Search (ES) index 120. An example document is shown below in greater detail in connection with FIG. 3A. Agent skills and proficiencies can be loaded into the agent skills database 112. In some embodiments, there are thousands of agents (e.g., 10,000-20,000) online at any given time, with a fraction of those agents servicing a customer at any given time. Elastic search is a powerful tool because it can return a list of the best matches according to computed conditional and word similarity scores. It is very sophisticated and can perform multiple searches in parallel. In some embodiments, one method to speed up the search is to create multiple copies of the data (e.g., across different servers—called primary and "replica" servers)—a process called "sharding."

When a call arrives, it moves into an entry point in the contact center 102. The customer navigates IVR, and KVPs are attached to the call in the process. In some embodiments, Amazon Lex can be used to perform speech-to-text operations and generate call KVPs for each inbound call based on the associated customer's input. If the customer requests an agent, a call flow in Contact Center 102 invokes a REST API call in 104 to initiate the ES Lookup function 124A (Lambda 1) to find one or more target skills in ES corresponding to the KVPs. Lambda 1 is responsible for querying ES using requests (e.g., posting an API call). The routing rules are stored in JSON format in 120, where each JSON object represents a rule. Lambda 1 returns an ES document to the initiating call flow in 102. In the case of the Amazon Connect contact center 102, it further triggers the Agent Search 124B function (Lambda 2). Lambda 2 is responsible for finding a match (e.g., the best match) by querying the agent skills database 112 for target skills and desired proficiencies across all agents. Lambda 2 also scans the agent status database 114 for all ready agents. If one or more suitable agents are available, Lambda 2 then selects the target agent based on certain pre-determined criteria, e.g., length of availability. Lambda 2 then sets the selected agent's status to busy. Connect then directs the call to the agent (or the target agent's queue). If no agent is available, Lambda 3 function 124C then writes call attributes to the call attribute database 110. The call treatment is then returned to Contact Center 102, and the call is moved to the customer waiting queue.

When an agent enters into a "ready" state, Kinesis 122 detects the event and triggers the "Select Call" function 124D (Lambda 4). Lambda 4 queries the call attribute database 110 to see if any calls are in the queue matching the newly available agent's skills. If there are one or more calls in queue, Lambda 4 targets the call that has been waiting the longest. Lambda 4 can also be programmed to read any "interaction priority" associated with the call, e.g., to ensure that higher priority calls are routed first. Lambda 4 then marks the call as "assigned" and changes the status of the agent to busy. Then, the Target Call function 124E (Lambda 5) scans the call attribute database 110 to look for calls set to "assigned". If it finds any, it moves the call to the targeted agent's queue.

The invention can also employ a principle called "target expansion." The basic principle is that the institution would prefer to answer each customer's call as soon as possible even if it means sending the call to a less than desirable agent. In the above description, the Agent Search function 124B (Lambda 2) can first search a skill level above an initial proficiency (e.g., greater than 8 out of 10). However, if after a certain predetermined time (e.g., 30 seconds) no agent has become available, the initial proficiency can be lowered (e.g., to greater than 3 out of 10), with the hope that more agents will now be available under the expanded search criteria. If more time passes (e.g., another 30 seconds) and no agents become available, the thresholds can be lowered even more, or removed entirely, with the goal of servicing the inbound call with an agent as soon as possible.

Figure 2:
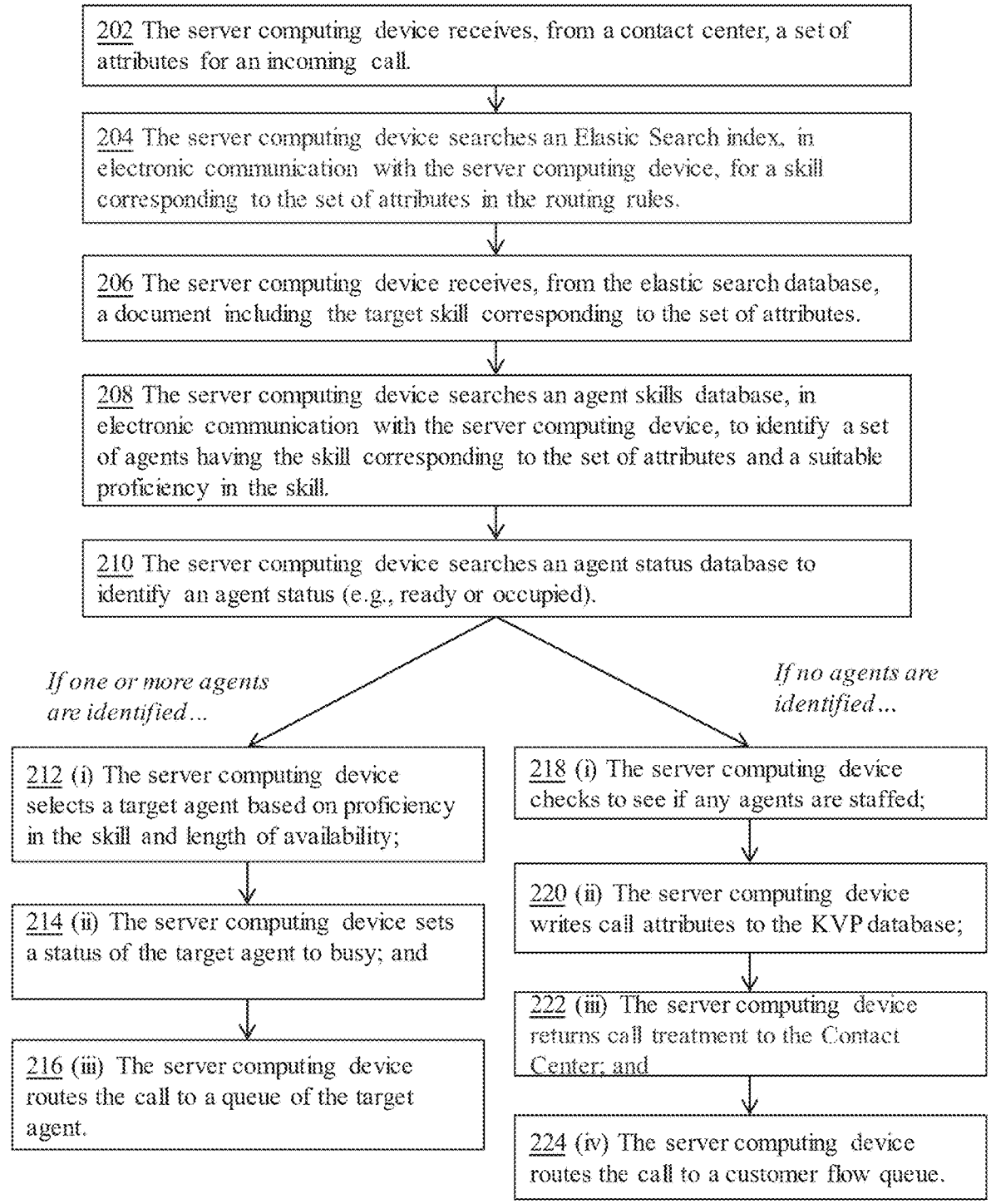
FIG. 2 is a flow diagram of a computerized method of routing calls, according to an illustrative embodiment of the invention.

FIG. 2 is a flow diagram of a computerized method 200 of routing calls (e.g., using the system 100 of FIG. 1), according to an illustrative embodiment of the invention. In a first step 202, a server computing device receives, from a contact center, a set of attributes (KVPs) for an incoming call. In a second step 204, the server computing device searches, using an elastic search function and word matching criteria, an elastic search index to find a match (e.g., the best match) of the call attributes as compared with the attributes included in the elastic search index (e.g., contained in JSON documents). A conditional search may be used, which can include "must" and/or "should" match conditions applied to each attribute. In a third step 206, the server computing device receives, with the elastic search function, from the elastic search database, a document (e.g., a JSON document) that meets (e.g., best meets) the word matching criteria for the set of attributes presented. This document includes the desired target skills, call treatment, and the target expansion rules. In a fourth step 208, the server computing device searches an agent skills database, in electronic communication with the server computing device, to identify a set of agents having the skill and a suitable proficiency in the skill (e.g., as specified in the JSON document) returned from the elastic search function. In a fifth step 210, the server computing device searches an agent status database to identify an agent status (e.g., ready or occupied). If one or more agents are identified, the server computing device: (i) selects a target agent based on length of availability (step 212); (ii) sets a status of the target agent to busy (step 214); and (iii) routes the call to the target agent (e.g., to a queue of the target agent) (step 216). If no agents are identified, the server computing device (i) checks to see if any agents are staffed (step 218); (ii) writes call attributes to the call attribute (or KVP) database (step 220); (iii) returns call treatment to Connect (step 222); and (iv) routes the call to a customer waiting queue (step 224).

FIG. 3A is an illustration of a JSON document 310, according to an illustrative embodiment of the invention. The JSON document 310 includes several attributes, such as the DialedNumber (e.g., Orig_DN) corresponding to the phone number the customer dialed. The IVR-Prompt indicates that this caller selected one of the following options by voice or DTMF in the phone tree. The document includes a target rule and a treatment rule, as well as other data, which can be used for labeling the call or consumed for future processing by a call reporting system.

FIG. 3B is an illustration of an agent skills and proficiency data segment 320, according to an illustrative embodiment of the invention. The data segment 320 includes a list of skills and proficiencies for three agents identified as A123101, A123102 and A123103. In this example, the syntax for the skill is SkillName1:SkillProficiency1, SkillName2:SkillProficiency2, etc.

FIG. 3C is an illustration of a rule segment component of the JSON document 330, according to an illustrative embodiment of the invention. The rule segment component 330 includes a treatment rule, which in this case returns a specific prompt (291) to play while the customer is in the wait queue. The target rule returns the desired agent skill, and values associated with the initial agent proficiency and the incremental target expansion. In this example it is incremented by 2 from a start condition of 2 but is not to exceed 10, but other values and combinations of values are also possible.

FIG. 3D is an illustration of a search query 340, according to an illustrative embodiment of the invention. The search query 340 includes conditional search statements that "must" or "should" match the call attributes. All "must" statements must be identical matches. "Should" statements are not necessary to match, but will trigger the Lucene word matching algorithm that will factor into the elastic search score.

Figure 4:
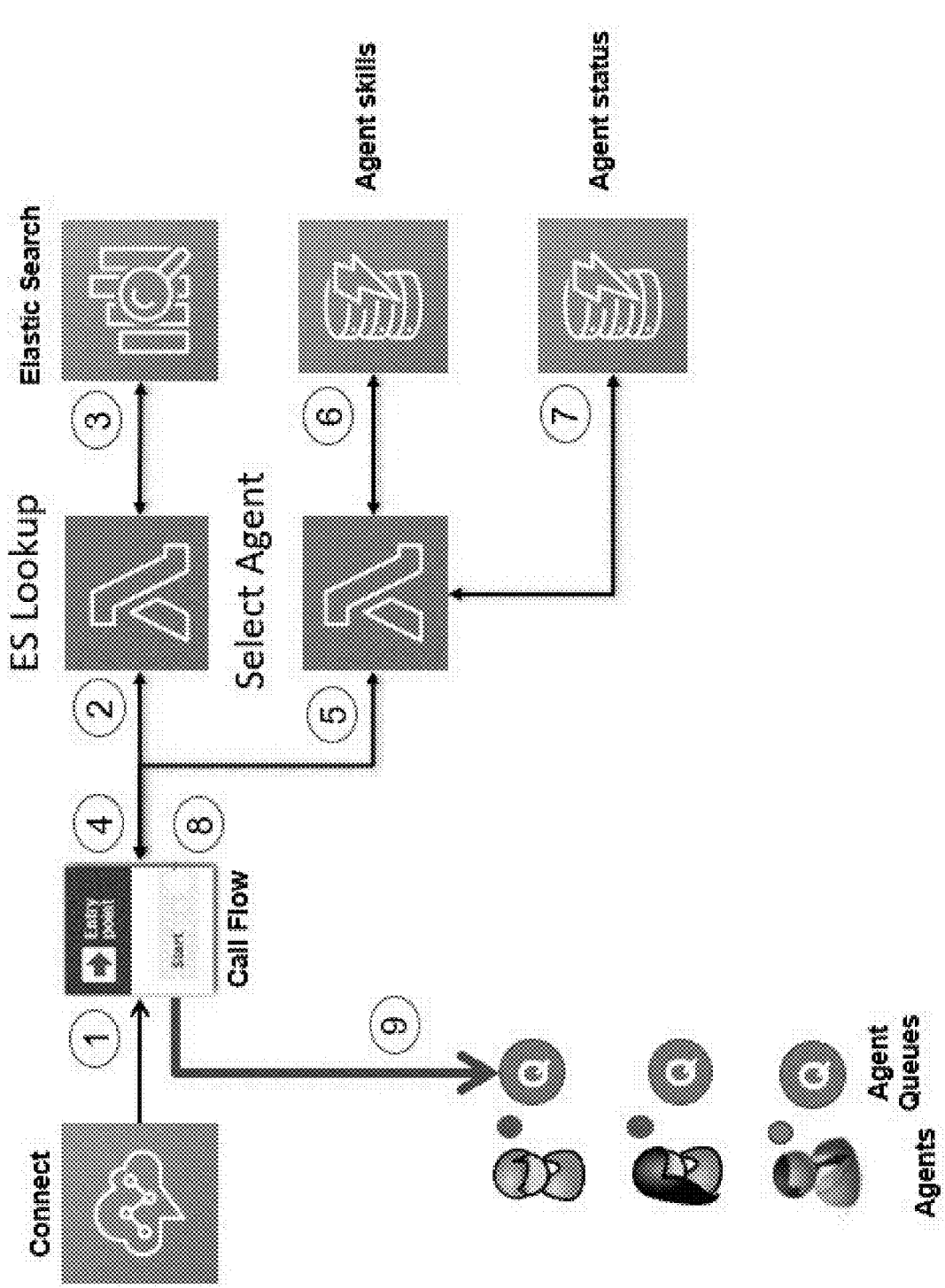
FIG. 4 is a flow diagram of a computerized method of routing calls, according to an illustrative embodiment of the invention.

FIGS. 4-7 show steps that can be executed on the system shown in FIG. 1 together with additional sequencing details that may be understood in this alternative visual representation. Steps are denoted with encircled numbers or letters denoting the steps (e.g., step 1 is denoted with the number "1" inside a circle, and so on). FIG. 4 is a flow diagram of a computerized method 400 of routing calls, according to an illustrative embodiment of the invention. In step 1, a customer call is received by a contact center system (e.g., Amazon Connect) and moves to a Call Flow entry point. In step 2, the call flow function of Connect invokes a lambda function "ES Lookup" (e.g., comparable to Lambda 1 function 124A). In step 3, the ES Lookup lambda function queries ES to look for routing rules based on the call's KVPs (which include, e.g., the dialed number, IVR prompt selected, etc.). In step 4, ES returns the skills, desired skill proficiency required to handle the call, and the target expansion rule. The ES Lookup lambda function returns the output to the call flow as call attributes. In step 5, the call flow function invokes a "Select Agent" lambda function (e.g., comparable to Lambda 2 function 124B) and passes those target skills and proficiencies as input. In step 6, the Select Agent lambda function scans the agent skill database to return all the agents trained for that skill with the required skill proficiency. In step 7, the Select Agent lambda function scans the agent status database to check for the agents' availability. In step 8, upon receiving an available agent, the lambda function returns a single target agent's details to the call flow function. In step 9, the call flow function transfers the call to the target agent (e.g., places the call in the target agent's queue). If the Select Agent lambda function does not retrieve any available agent, the steps in FIG. 5 can be utilized.

Figure 5:
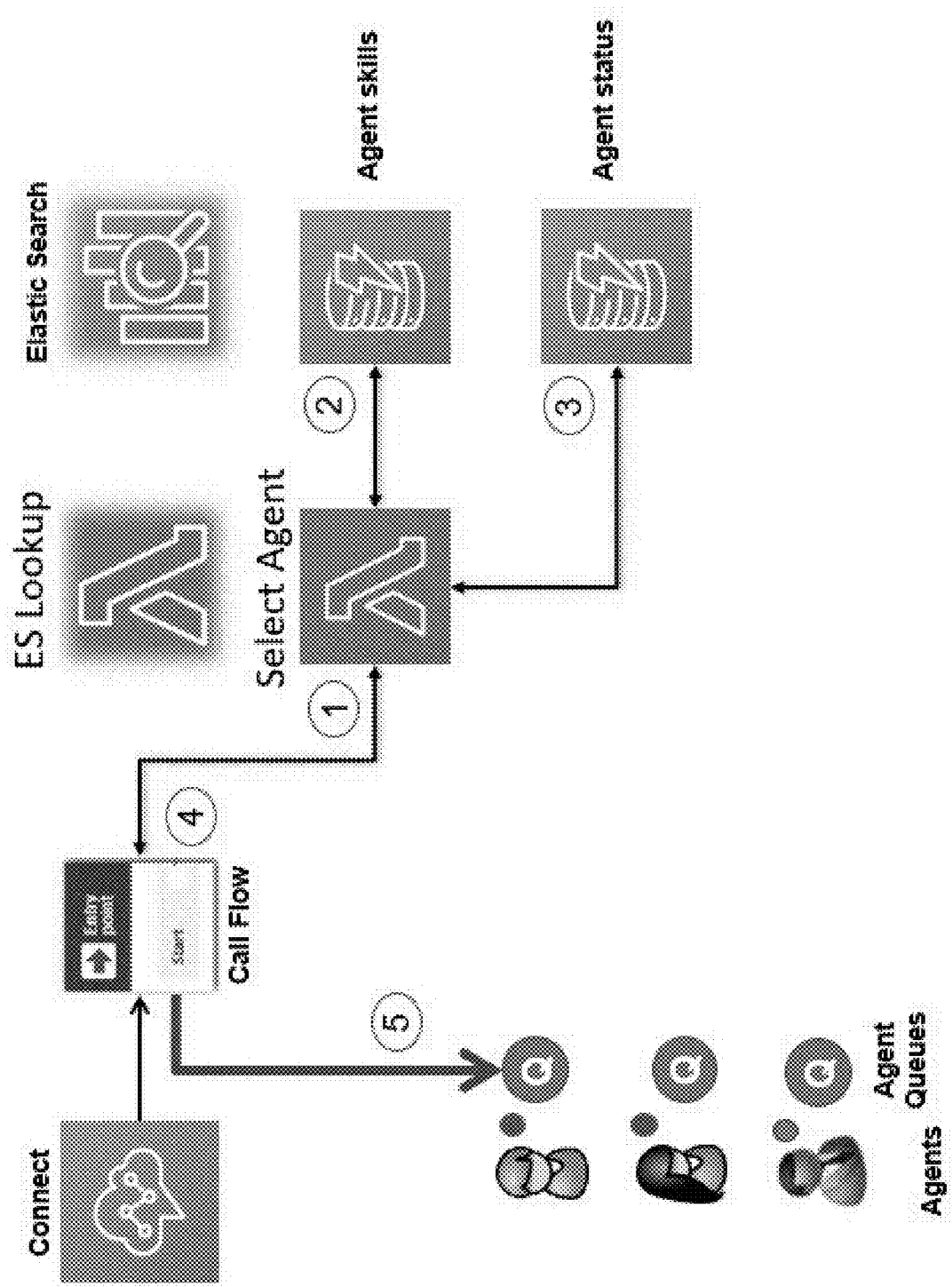
FIG. 5 is a flow diagram of a computerized method of target expansion for selecting an available customer service agent, according to an illustrative embodiment of the invention.

FIG. 5 is a flow diagram of a computerized method 500 of target expansion for selecting an available customer agent, according to an illustrative embodiment of the invention. If the Select Agent lambda function does not retrieve any available agents, it can wait for a predetermined time interval (e.g., 30 seconds, during which call treatment music is played for the customer) and then perform a "target expansion" with respect to the agents required for the call (e.g., by adjusting the target proficiency for one or more required skills for servicing that call). In step 1, the call flow function invokes the Select Agent lambda function after a predetermined time interval (e.g., 30 seconds) and passes the desired skills and proficiencies to the Select Agent lambda function. In step 2, the Select Agent lambda function scans the agent skill database to obtain all the agents trained for that skill with the required skill proficiency. In step 3, the Select Agent lambda function scans the agent status database to check for the agents' availability. In step 4, upon targeting an available agent, it returns the agent's details to the call flow. In step 5, the call flow transfers the call to the available agent.

Figure 6:
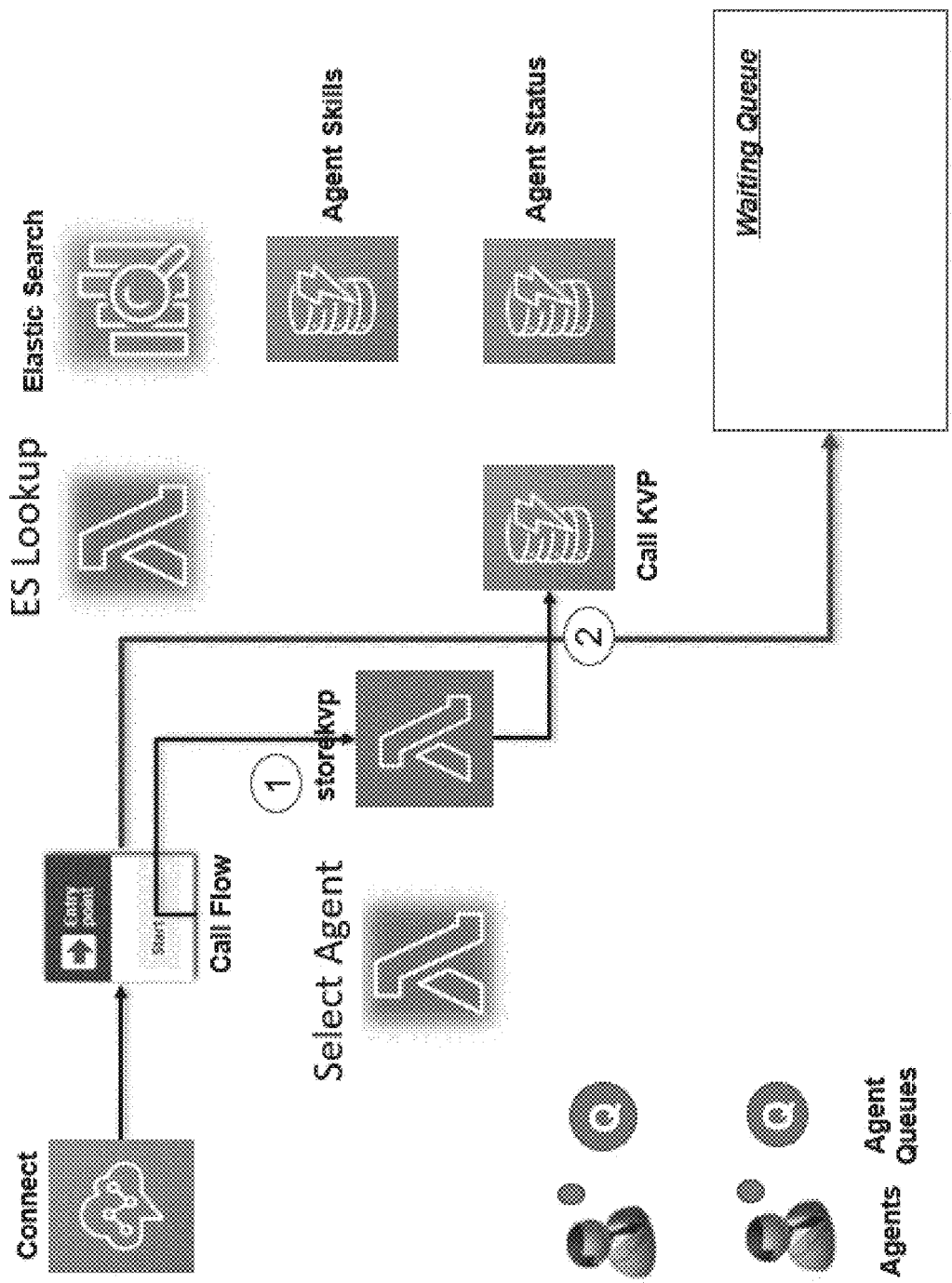
FIG. 6 is a flow diagram of a computerized method of routing a call if a target expansion process returns no available customer service agent, according to an illustrative embodiment of the invention.

FIG. 6 is a flow diagram of a computerized method 600 of routing a call to a waiting queue if a target expansion process returns no available customer agent, according to an illustrative embodiment of the invention. If the Select Agent lambda function does not target an available agent even after the target expansion is performed, the call will be transferred to a waiting queue after writing the call details in the call attribute (KVP) database, e.g., using the storekvp function (e.g., comparable to Lambda 3 function 124C). Here the call details are contact ID (unique for each and every call), time stamp, and target agent skill and proficiency.

Figure 7:
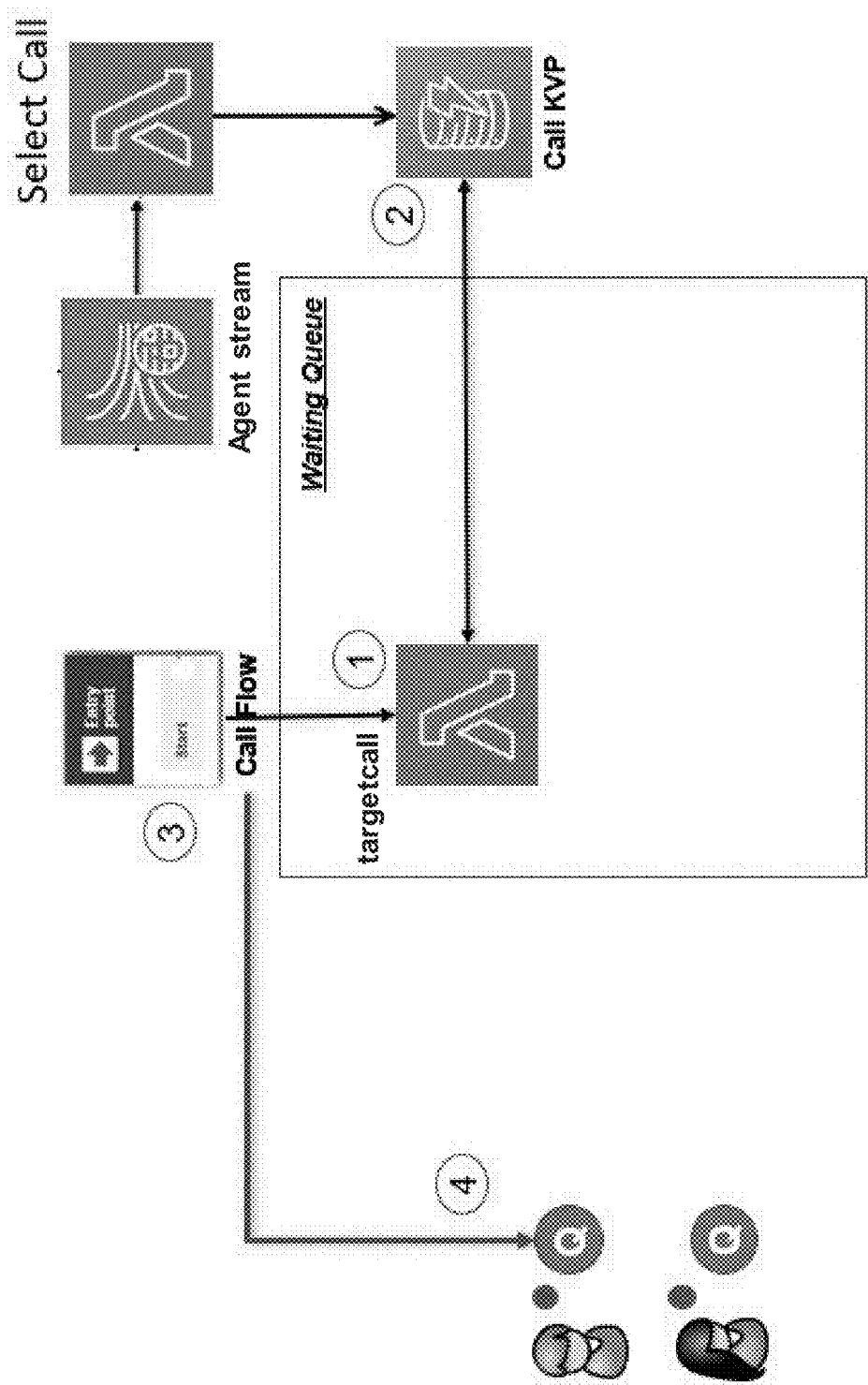
FIG. 7 is a flow diagram of a computerized method of matching a newly available customer agent with a target customer call, according to an illustrative embodiment of the invention.

FIG. 7 is a flow diagram of a computerized method 700 of matching a newly available agent with a target customer call, according to an illustrative embodiment of the invention. When an agent comes online, the "Select Call" lambda function (e.g., comparable to Lambda 4 function 124D) is triggered via the Kinesis data stream, which then scans the call attribute (KVP) database to take the call that matches the agent's skill and proficiency level. If it successfully finds a call that matches the agent's skill and proficiency level, then the Select Call lambda function sets an attribute in the Call Attribute database to set the call to "assigned." In step 1, call flow invokes the "Target Call" lambda function (e.g., comparable to Lambda 5 function 124E) periodically (e.g., every 5 seconds). In step 2, the target call lambda function queries the call attribute (KVP) database to determine whether or not an agent is assigned to the call. In step 3, if an agent is assigned, it returns the agent details to the call flow. (If it does not find any agent assigned, the call continues waiting in the queue.) In step 4, the call flow transfers the call to that agent.

Figure 8:
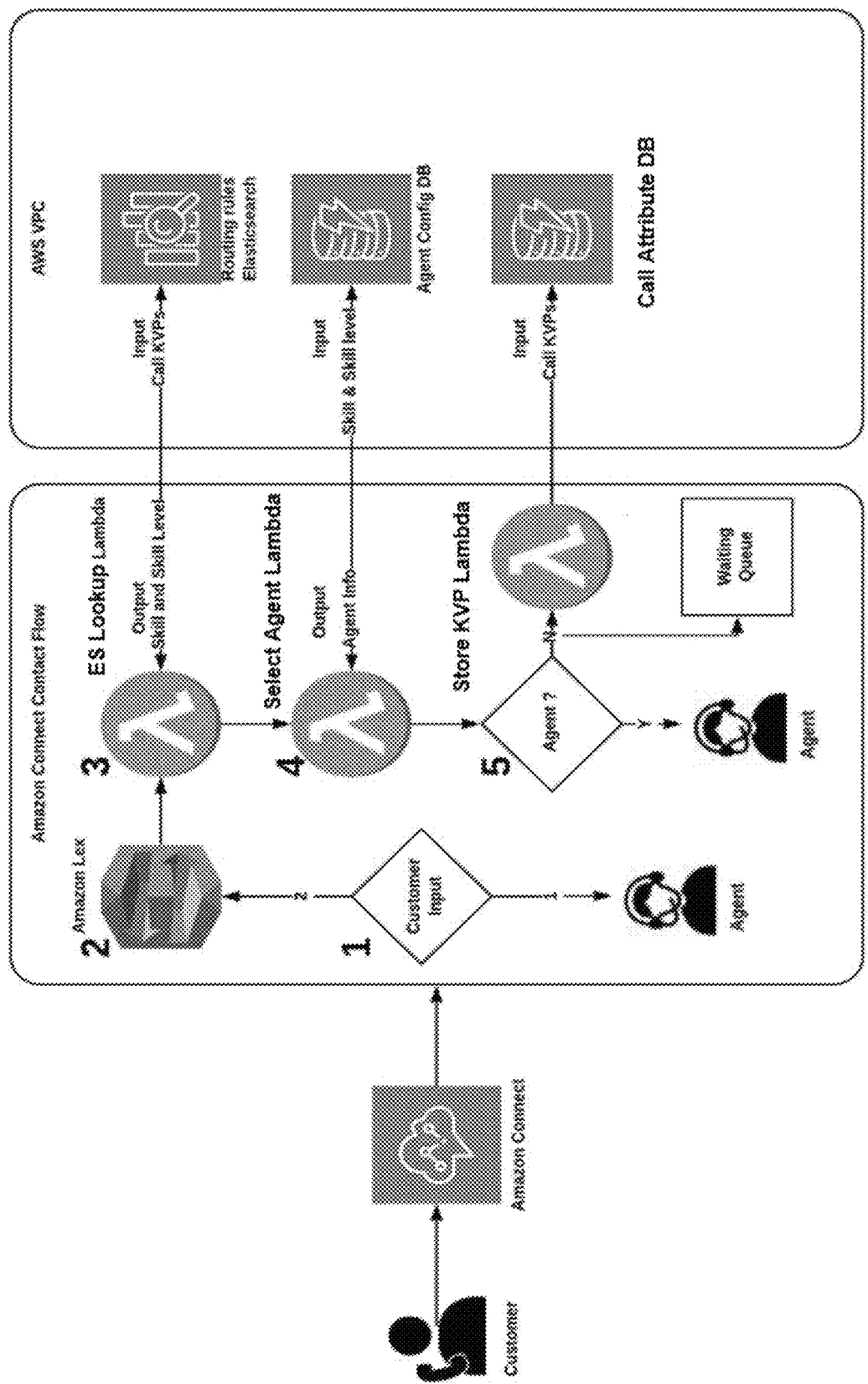
FIG. 8 is a flow diagram of another computerized method of routing calls to available agents, according to an illustrative embodiment of the invention.

FIG. 8 is a flow diagram of another computerized method 800 of routing calls, according to an illustrative embodiment of the invention. In step 1, a call placed by a customer is received by the contact center system (e.g., Amazon Connect). In some embodiments, the customer is asked to enter his or her advisor's phone extension or remain on the line for the next available agent. If the customer's advisor is unavailable, the customer can be given an option to leave a voicemail message. In step 2, if the customer stays on the line, the customer is asked to provide customer input (e.g., to state the purpose of the call). A speech-to-text computing module (e.g., Amazon Lex) performs speech-to-text recognition on the customer's speech to determine the intent of the call. The call intent and the dialed number can constitute the KVPs of the incoming call. In step 3, a call flow function (e.g., the call flow function of Amazon Connect) invokes a lambda function (e.g., "ES Lookup"). The ES Lookup lambda function queries ES to look for a skill and/or skill level based on the incoming call's KVPs. ES then returns the skill and skill level (and target expansion, if any) required to handle the call, which are then returned to Contact Flow as call attributes. In step 4, Contact Flow invokes a "select agent" lambda function and scans the Agent Config database to search for an available agent who has the required skill and skill level. The Agent Config database returns the output agent information to Contact Flow. In step 5, Contact Flow checks for the output returned. If Contact Flow obtains information for a suitable agent, it transfers the call to that agent (e.g., the agent shown). If Contact Flow does not obtain information for a suitable agent, it outputs a null value, writes the call KVPs and attributes in the call attribute database and transfers the call to a waiting queue. In some embodiments, the call KVPs and attributes refer to the contactID (unique identifier of the caller), skill, skill level, target expansion, call queue time, and/or call priority.

Figure 9:
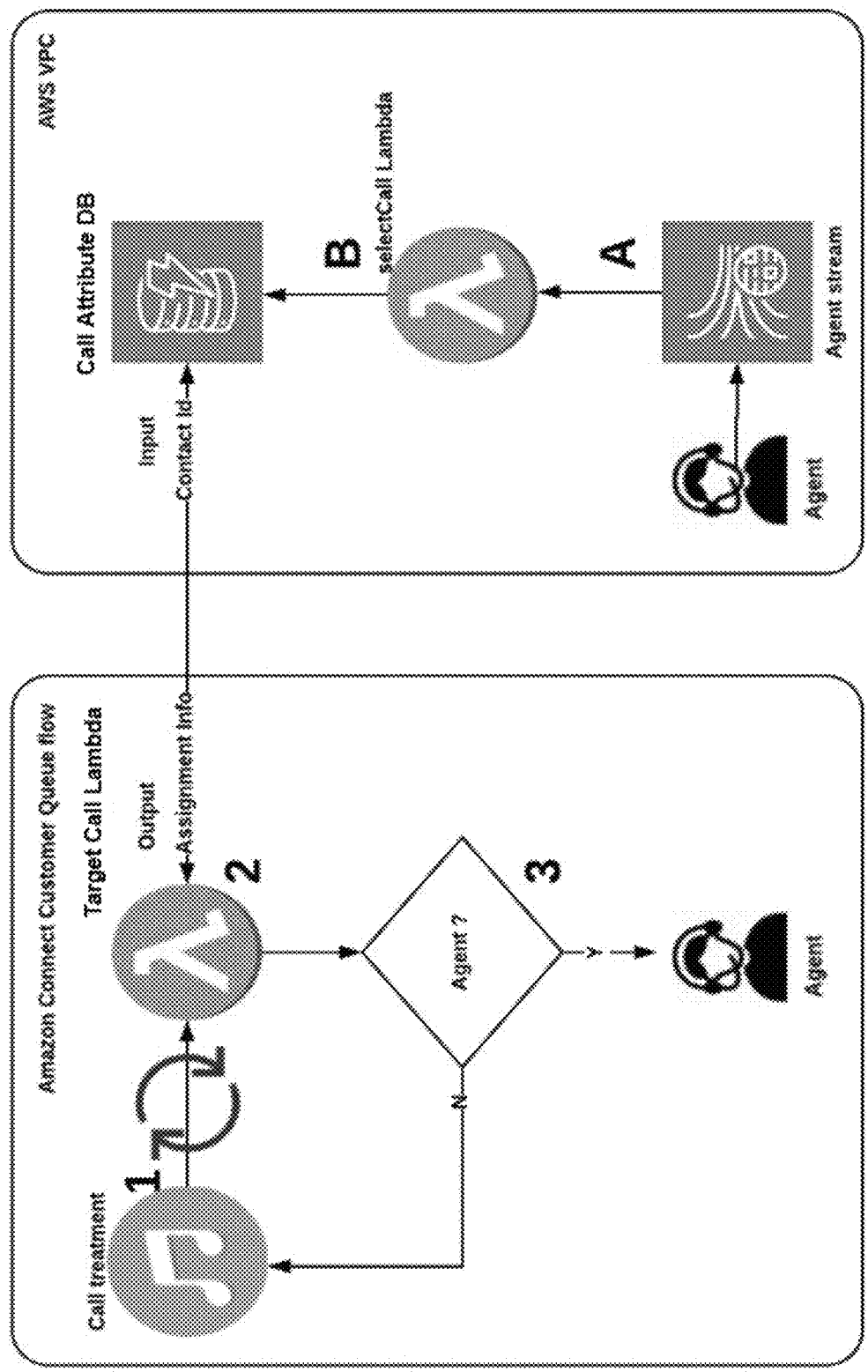
FIG. 9 is a flow diagram of another computerized method of (i) matching a newly available customer agent with a target customer call, and (ii) target expansion for selecting an available customer agent, according to an illustrative embodiment of the invention.

FIG. 9 is a flow diagram of another computerized method of (i) matching a newly available customer agent with a target customer call, and (ii) target expansion for selecting an available customer agent, according to an illustrative embodiment of the invention. In step A, the live data streaming function (e.g., Amazon Kinesis) detects any changes in the status of each available agent (e.g., then agent shown). When the agent becomes available, the live data streaming function invokes a selectCall lambda function. Here, the selectCall lambda function provides event source mapping of the live data stream. In step B, the selectCall lambda function scans the call attribute database to look for the call with the highest priority and waiting time and matches its call attributes (e.g., skill, skill level, and/or target expansion skills) with the agent's skill and skill level. If there is a match, the selectCall lambda function updates the agent information in the call attribute database and changes the agent's status to "busy." In some embodiments built in Genesys, the Genesys workflows are pointed to call the Rest API with incoming call KVPs as a request body. The REST API is a front end to a lambda function, which receives the input, forms an ES query and returns the output to Genesys. In this case, the output is the set of KVPs that is required to handle the call. Genesys makes use of those returned KVPs to transfer the call to an agent with the required skill and skill level.

FIG. 9 also shows an event flow for target expansion for selecting an available customer agent and customer treatment (e.g., in steps 1-3). In step 1, the customer is treated in a waiting queue by a set of prompt files and treatment music. In step 2, the customer queue flow invokes a Target Call lambda function at a periodic interval (e.g., every five seconds). This lambda function queries the call attribute database to look for the agent assignment for the call. In some embodiments, the call attribute database is scanned as soon as an agent becomes available, and the agent information is updated if the agent has the required skill and skill level. The input provided for the query can be a contactID. In step 3, the customer queue flow checks for the output returned. If it receives the agent information, it transfers the call to the associated agent (e.g., the agent shown). An output with a null value makes the customer wait further.

Figure 10:
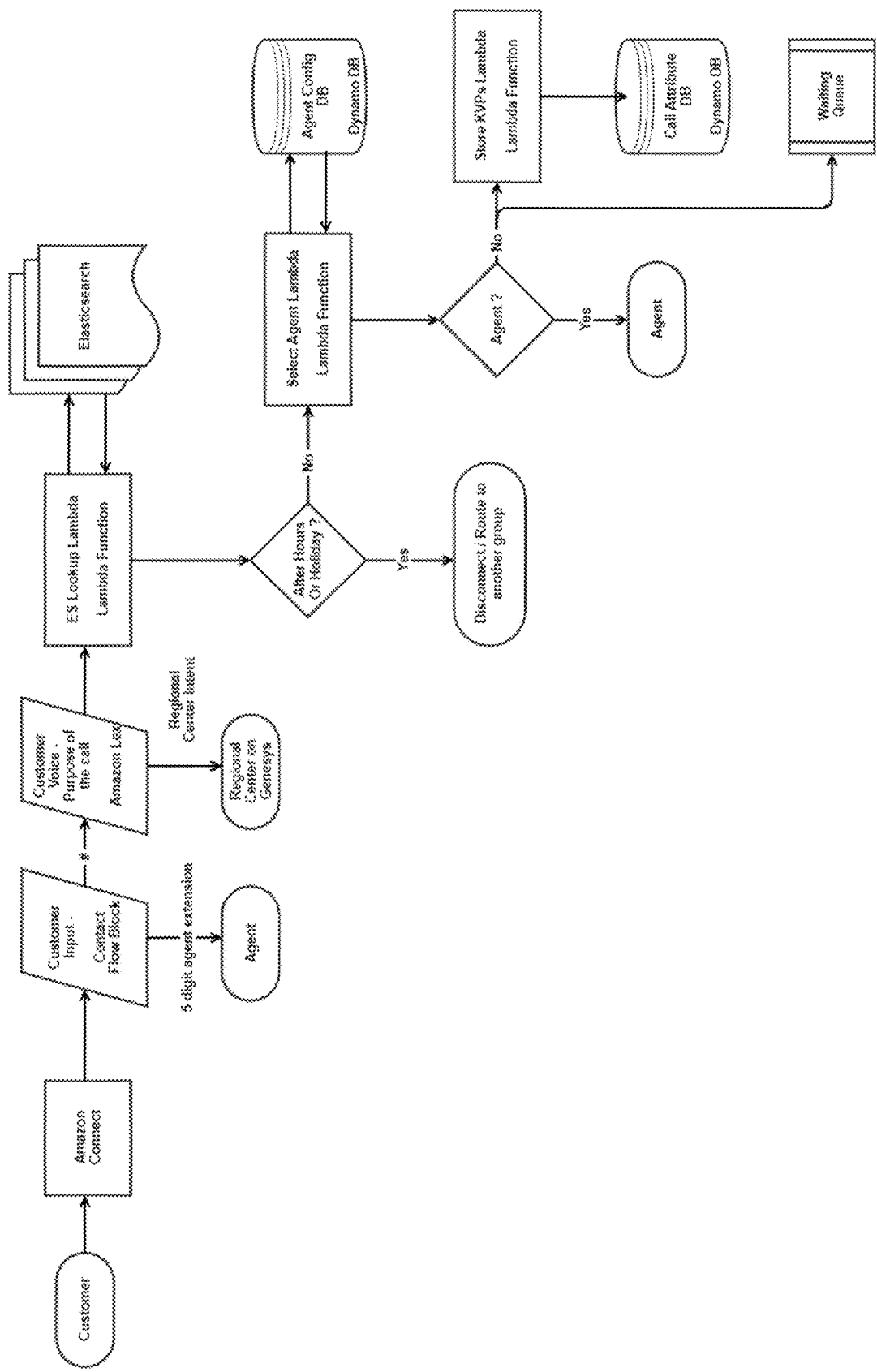
FIG. 10 is a flow diagram of another computerized method of routing a call, according to an illustrative embodiment of the invention.

FIG. 10 is a flow diagram 1000 of another computerized method of routing a call, according to an illustrative embodiment of the invention. In one example implementation, ES routing was deployed in investment center branches in Amazon Connect non-production in a structure having approximately 200 US-based branches with an average of 16 agents per branch. In this setup, each branch has its own unique toll free number, and each branch agent has a unique 5-digit phone extension. Calls that are not answered by agents in the branch within three minutes are routed to a regional contact center that is staffed 24×7. Calls for Lex intents that mapped to service calls are routed directly to the regional contact centers.

For an incoming call, the "customer input" in the contact flow block asks to enter an agent extension or press # (pound). If the customer dials the agent extension, the call goes to the branch agent. Pressing # keeps the customer in the flow, and Amazon Lex asks for customer input (e.g., "Can you briefly tell us why you are calling today?"). Amazon Lex then performs speech-to-text conversion and generates intents based on the customer's response. Intents can be used, e.g., to decide whether the call should be routed to an investment center for resolution or should be transferred to a regional center. If the call is determined to be for an investment center, contact flow stores the dialed number as contact flow attributes.

Based on the stored dialed number, an ES Lookup lambda function queries ES to obtain the required set of rules that is needed for handling the call. The returned rules contains the time zone to check for working hours and holidays, call disconnect behavior, call treatment and target information. The contact flow executes a lambda function to check for holidays and then executes the "hours of operations" block for the returned time zone. If the call has come on a holiday or after hours, the call will be disconnected or routed to a different group (such as the regional contact center) based on the call disconnect behavior. If the call has come during the working hours, a Select Agent lambda function scans the agent config database to obtain an agent with the required skill and skill level. If it gets the agent, the call is transferred to that agent. If it does not get the agent, then the call is put in a waiting queue after writing the call attributes into the call attribute database.

FIG. 11A shows an exemplary database entry 1102 in a call attribute database when the customer enters the waiting queue. Here, the required skill is "Skill B" and the required skill level is 10. When the agent becomes available, Kinesis invokes a selectCall lambda function. Here, the selectCall lambda function functions as the event source mapping of the Kinesis stream. The selectCall lambda function scans the call attribute database to look for the call with the highest priority and/or waiting time and matches its call attributes (e.g., skill, skill level, and/or target expansion skills) with the agent's skill and skill level. If there is a match, it updates the agent information in the call attribute database and changes the agent's status to "busy." The customer queue flow looks for the agent assignment at a periodic interval (e.g., every five seconds), so if it notices the "agent assigned" field in the call attribute database, it transfers the call to that agent. If the agent does not have the required skill and skill level, then the customer continues to wait in the waiting queue.

FIG. 11B shows an exemplary database entry in a call attribute database when the agent becomes available and has the skill and skill level to handle the call. Here, the selectCall lambda function has assigned the call to AgentB since it has the required skill and skill level.

FIG. 11C shows an exemplary database entry in a call attribute database when the status of AgentB is changed to Busy. As mentioned above with respect to FIG. 11B, because the call is assigned to AgentB, the status of AgentB changes to "Busy," thereby preventing AgentB from being the target of subsequent routing decisions until the agent has completed the call (and thus had his or her status changed back to "Ready."

In some embodiments, managing thousands of rules is a formidable challenge, and a user interface (UI) has been developed to manage the routing rules in a simple manner. A user can create, edit and delete the routing rules stored in Elasticsearch from the UI. FIG. 12 is an exemplary segment of Elastic Search routing rules, according to an illustrative embodiment of the invention. The routing rules in FIG. 12 relate to routing rules for branches that were loaded in to Elasticsearch. The branch routing rules package has different phases—6 OpenClosed, 2 Treatment, 2 Target Selection, and 5 Ixn Type rules. In some embodiments, an OpenClosed rule phase provides data which indicates whether the call has come during business hours or non-business hours. A Target Selection rule phase provides information about the skill and skill level required to handle the call. A Treatment rule phase provides information about the treatment music, duration etc. which needs to be played when a customer is in a waiting queue. An Ixn Type rule phase contains the mapping between the Dialed Number and the Branch Id (Ixn Type).

In some embodiments, each rule phase is a document in Elasticsearch. If a user wants to change anything in the rules stored in Elasticsearch, then they can change it in the UI either by editing the field or by importing data (e.g., an Excel sheet) with the new values. In both cases, the changes will be reflected into Elasticsearch.

Figure 13A:
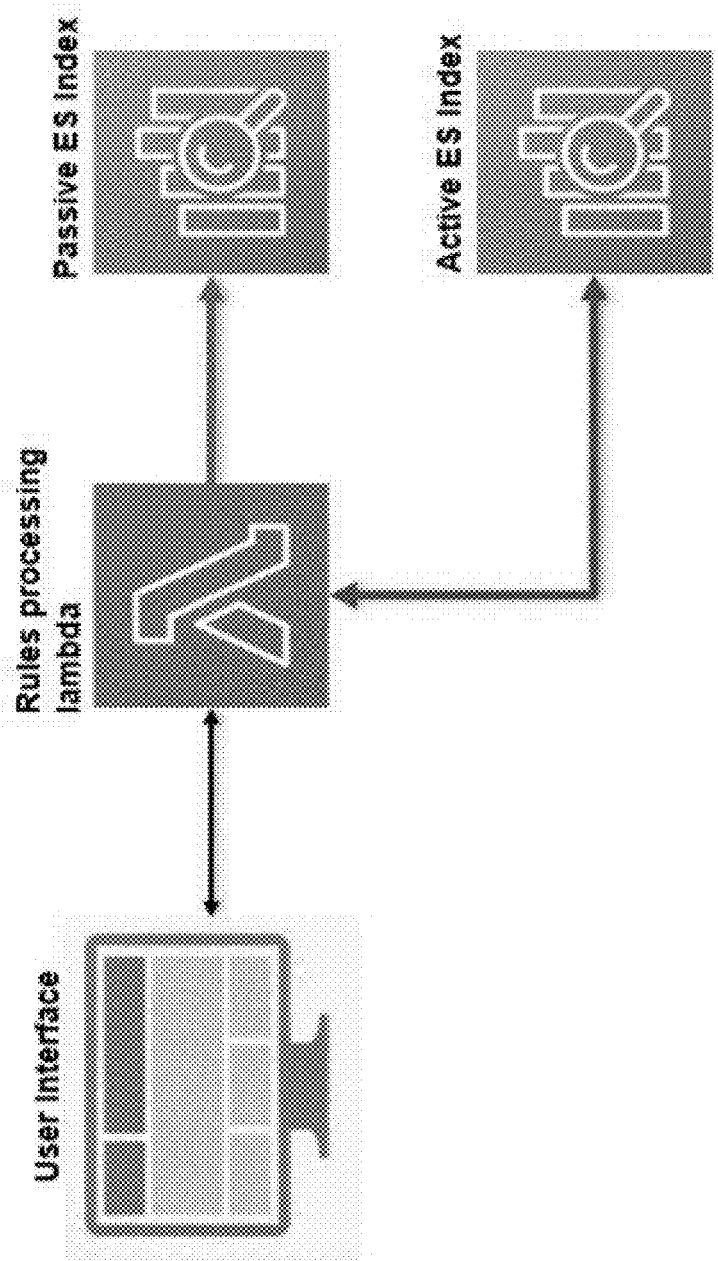
FIGS. 13A-13B are diagrams of an exemplary architecture for managing routing rules via a UI, according to an illustrative embodiment of the invention.
Figure 13B:
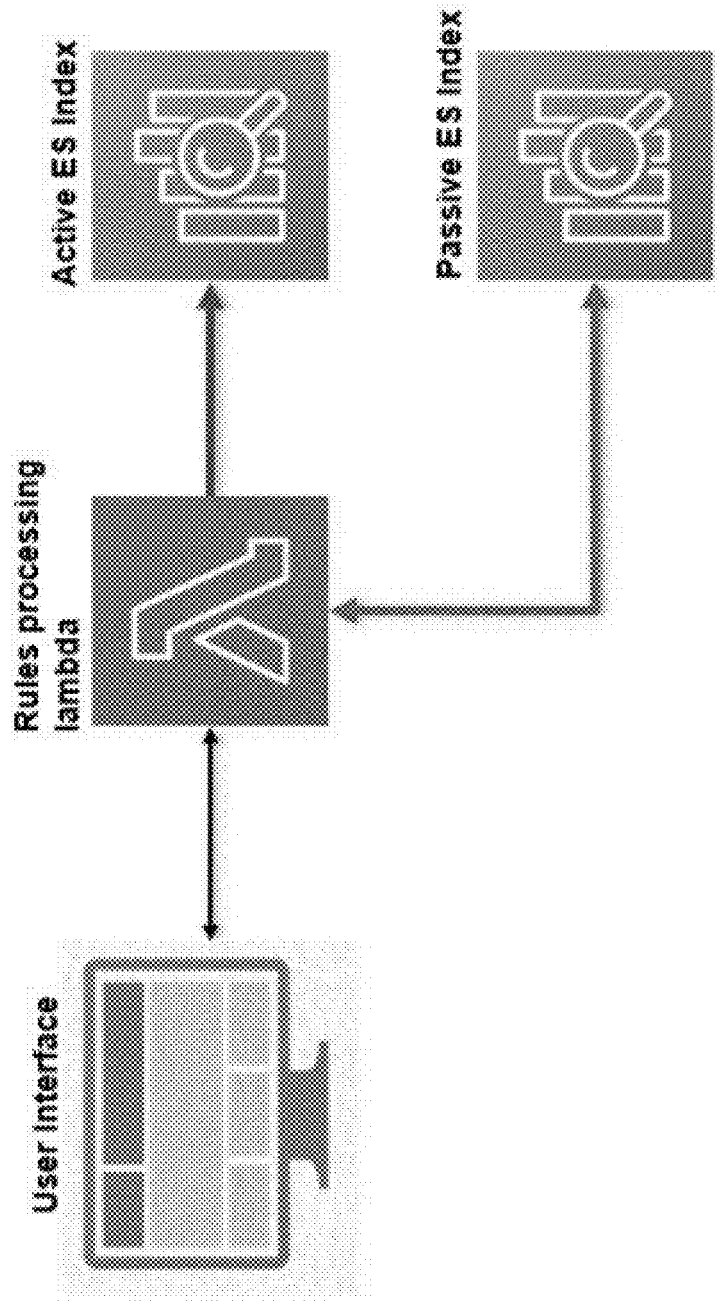

As can be appreciated, the UI is built to view and manage the rules in the easiest and most user friendly manner. FIGS. 13A-13B are diagrams of an exemplary architecture 1300 for managing routing rules via a UI, according to an illustrative embodiment of the invention. For example, the architecture 1300 follows an Active-Passive AWS service model, meaning that any changes made in the UI get reflected into the passive Elasticsearch index which will be in sync with the active Elasticsearch Index. The rules processing lambda function runs an automated rules testing and validation process (e.g., using various test cases) which validates any changes to the rules. Only after successful completion of the rules testing and validation process will the rules processing lambda function switch the index (with the updated rules) to the active Elasticsearch Index (see FIG. 13B).

Figure 14A:
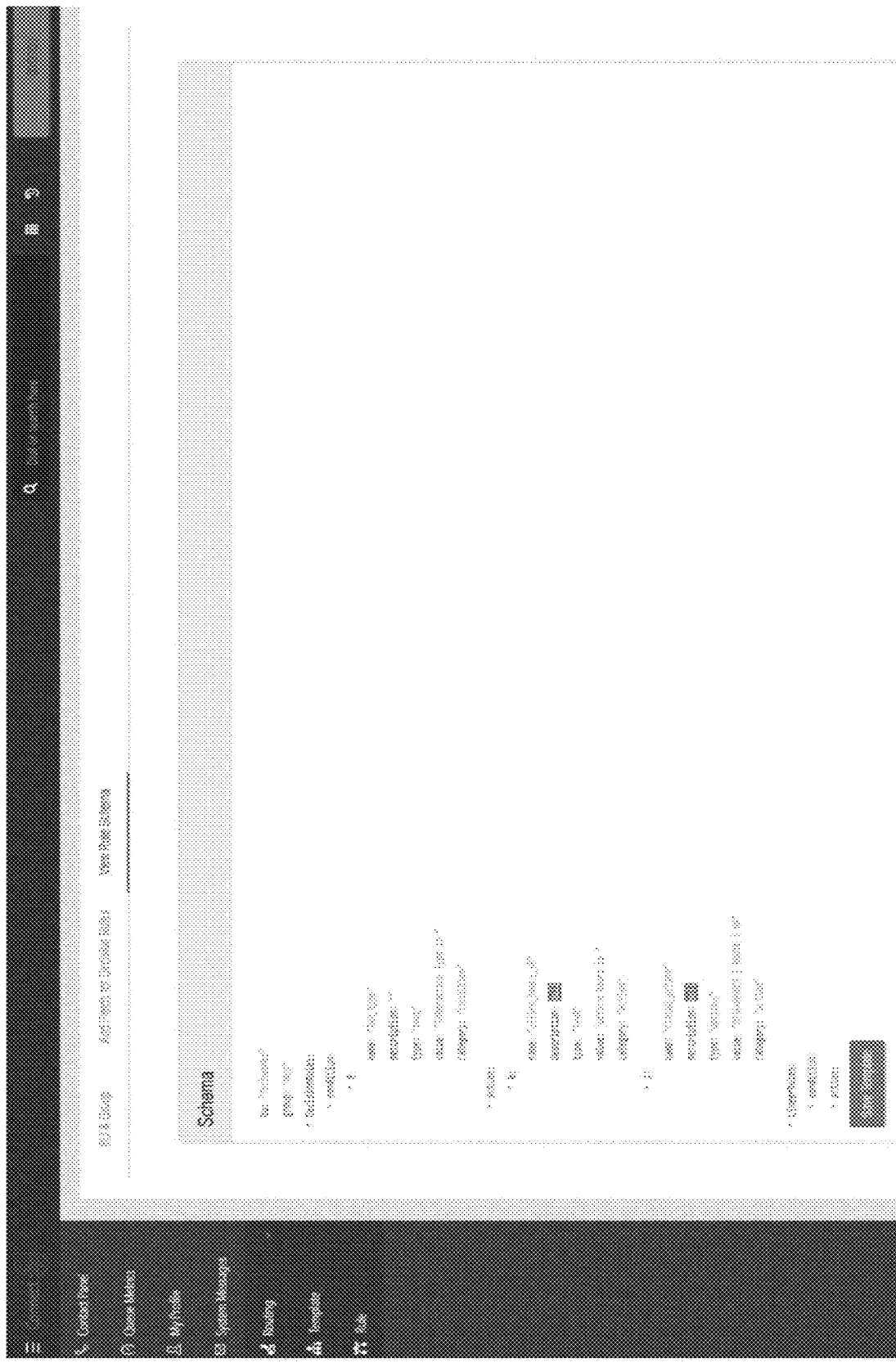
FIGS. 14A-14D are screenshots of exemplary user interfaces for building and maintaining Elastic Search routing rules, according to an illustrative embodiment of the invention.
Figure 14B:
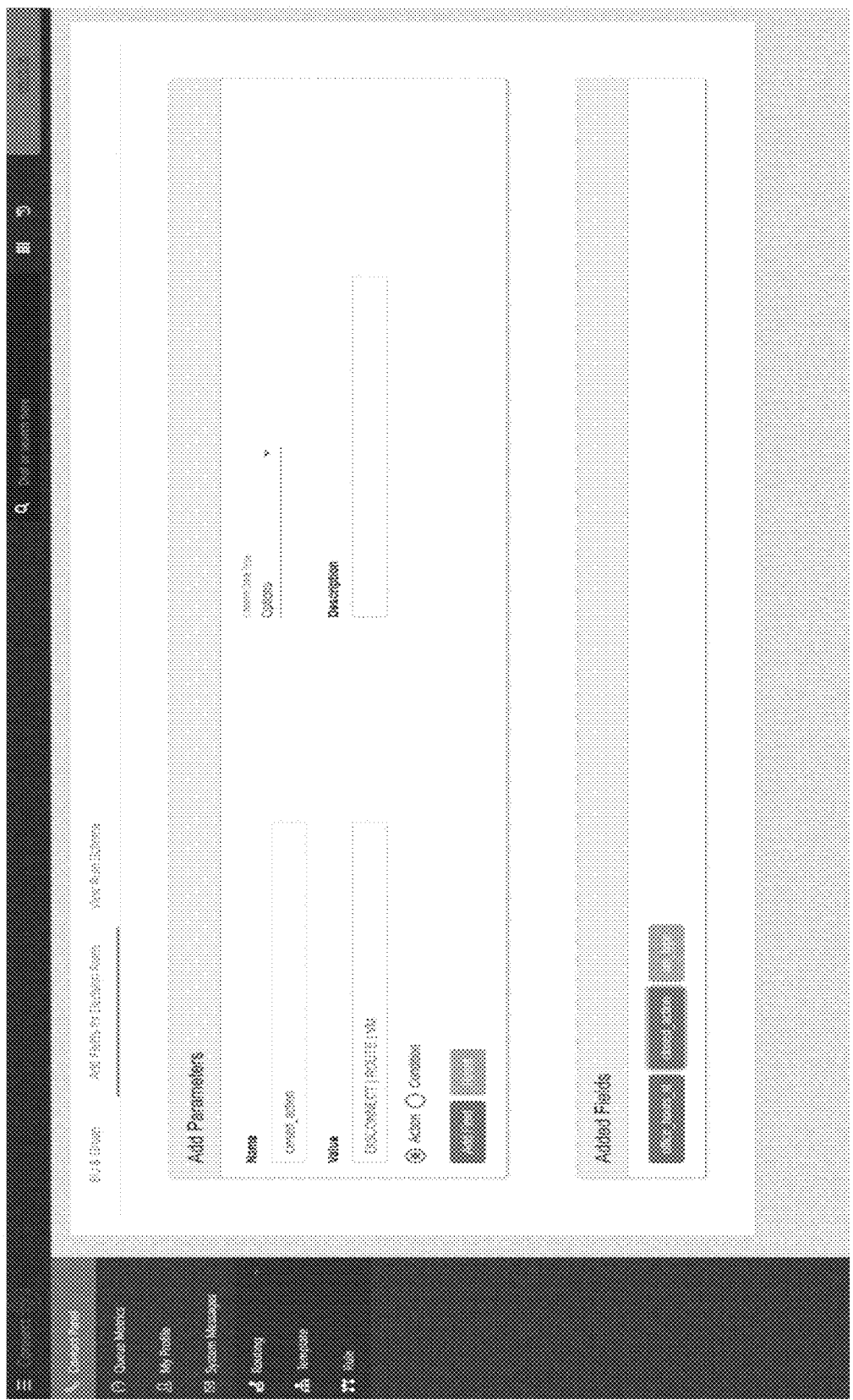
Figure 14C:
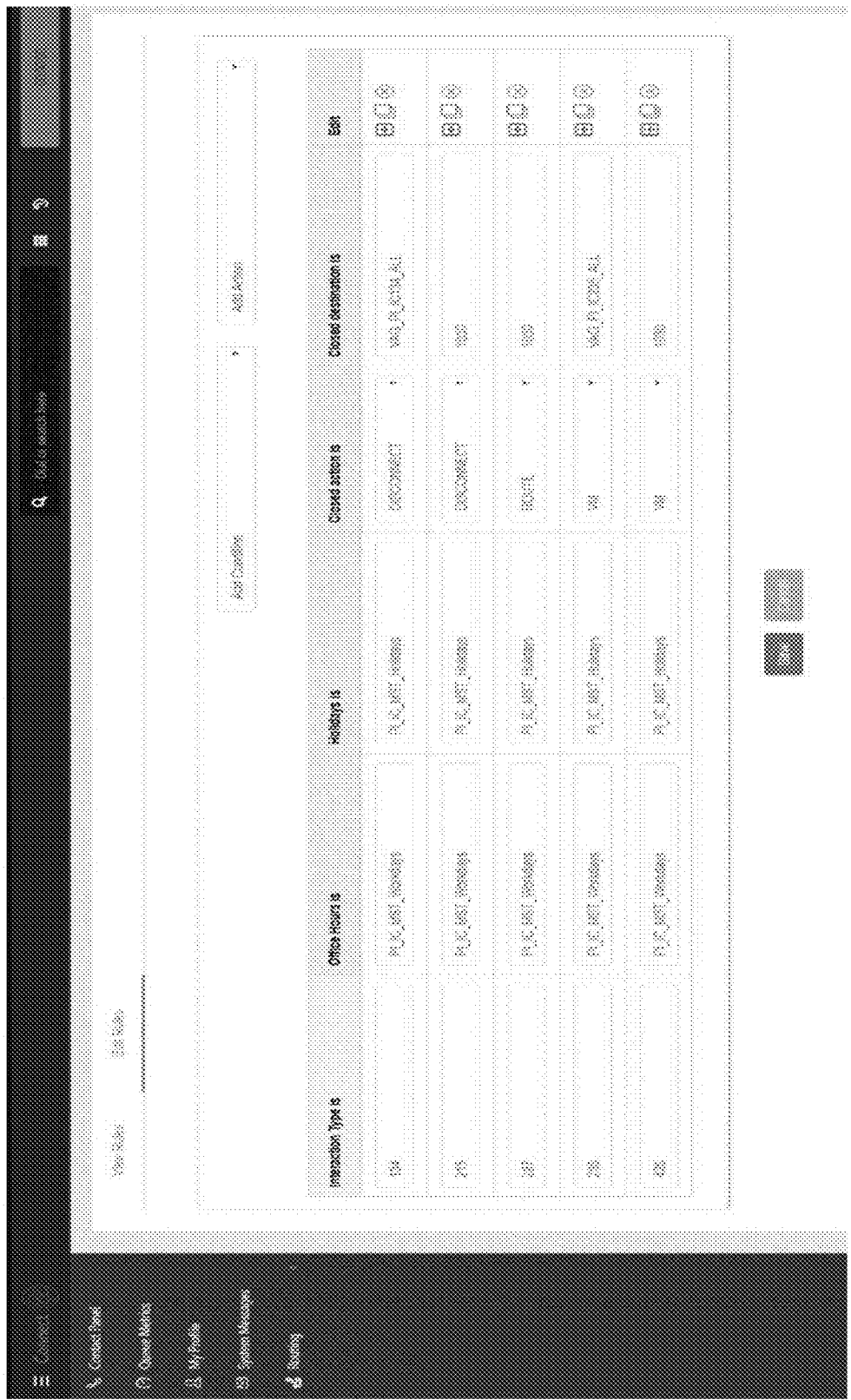
Figure 14D:
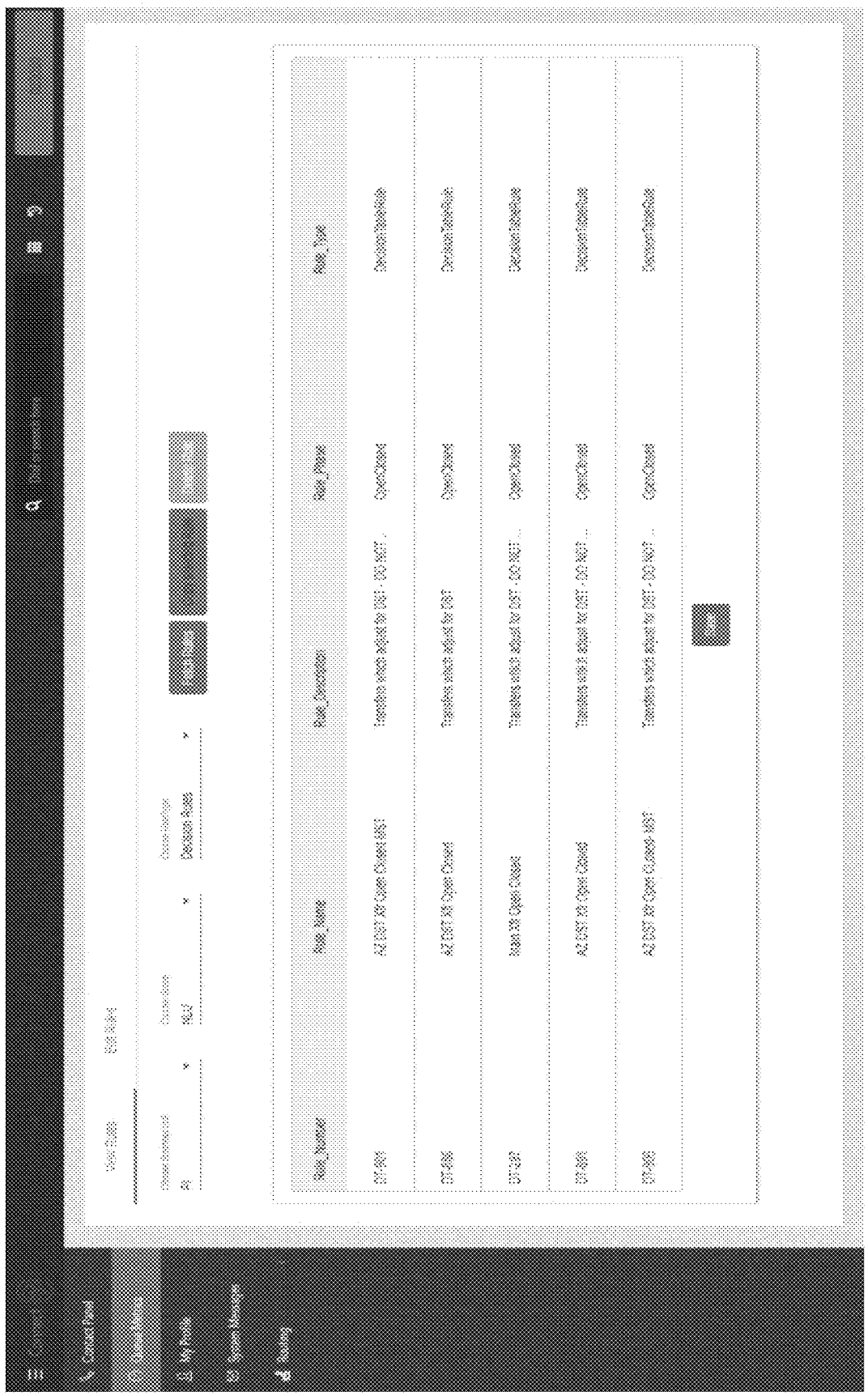

FIGS. 14A-14B are screenshots of exemplary user interfaces for building and maintaining Elastic Search routing rules, according to an illustrative embodiment of the invention. As shown in FIGS. 14A-14D, a user can view, create, edit, update, and remove routing rules and their associated parameters to fully customize the routing ruleset. FIG. 14A provides a UI for viewing the rule schema, FIG. 14B provides a UI for adding fields to decision rules, FIG. 14C provides a UI for editing rules, and FIG. 14D provides a UI for viewing decision rules.

In one aspect, the methods and systems described herein can dynamically and intelligently route calls (e.g., within a call center). A query function can be used to match attributes of incoming calls directly to a database of agent profile documents (e.g., JSON documents) contained in an Elastic Search index and route the call based on the highest score match. For example, Elastic Search can compute these scores using the Lucene Practical Scoring Function. It allows disparate attributes of type Boolean, text, number, and date to be matched. It also allows a powerful fuzzy text-based search based on the Levenshtein algorithm to be employed. The call attribute document to be matched may contain hundreds of attributes. The Elastic Search "coordination" factors into the scoring the total number of query terms from the attributes of the incoming call that match the agent profile document. The Elastic Search native "boost" function allows for prioritizing of the matching of one attribute over another. The capabilities of Elastic Search allow for the elimination of complex and difficult to maintain proprietary routing rules, skills and proficiencies used in routing strategies and operate directly on the attributes that are present in the call.

In one exemplary AWS implementation, the invention has been built for the Genesys Engage premise solution and the Amazon Connect cloud-based contact center. JSON documents can be formulated, one for each agent, to include call attributes that the agent services. The JSON documents can be loaded into an Elastic Search (ES) index. AWS lambda functions can be used to query ES with call associated data (as can, for example REST APIs from Genesys). One lambda function can be called from a Connect call flow to query ES with a given set of call attributes. The resulting agent with the highest Elastic Search score can be returned with the call placed directly to that agent or designated to that agent's queue.

In some embodiments, the call attributes include at least a dialed phone number, and one or more caller selections made during an IVR selection process, customer originating phone number (ANI) and call arrival time. In some embodiments, the call attributes include at least a unique identifier of the caller and a call priority. In some embodiments once the caller identifies or authenticates themselves, the call data can be augmented by customer profile data or customer historical data.

In some embodiments, the agent attributes have the same naming convention as the call attributes (for example appointment_type=new). The agent attributes can include the unique agent system identifier such as a corporate ID. The agent profile can include attributes that may not be in the call attributes but may be used for non-routing processing, such as the agent date of hire, agent location (domestic and international) and agent pay scale. The ultimate goal is for the agent to specify "I take calls for new appointments for higher value English and Spanish speaking customers that are online when the call us at 800 555 1212 or 800 555 1213" and parse this into a set of agent attributes that match those populated for inbound calls.

In some embodiments, the query criteria include at least one required condition "MUST" or at least one preferred condition "SHOULD". In some embodiments, identifying the document includes scoring all the agent documents in the search index and selecting the document having the highest score.

In some embodiments, each inbound interaction (call or chat) and its associated KVPs can be formulated as an Elastic Search query in an AWS lambda function. The lambda function can search for exact matches for some attributes (agents_status=available), fuzzy matches for other attributes (customer profile=high), Boolean operations on attributes (language_spanish=true), and return numeric values for agent length of availability (agent_status_timestamp). Once the Elastic Search Lucene Practical Scoring Function produces a score for the call attributes against each agent, the call is routed to the agent with the highest score (optionally above some minimum score). In this manner, instead of calls being serviced strictly in the order of their arrival, calls can be serviced as agents that service those call attributes become available. The ES domain can be hosted on AWS, which itself can be accessible via secure REST APIs. Since these rules can be exposed via secure REST APIs, any contact center solution can use ES, making it vendor-agnostic and allowing users to build their own JSON-documents describing the call attributes that their agents serve. In this way, a routing strategy can be executed in ES, and the results can be returned to the proprietary contact center solution, which can then direct the call to the selected agent.

In one aspect, there is a system for routing calls. The system includes a server computing device comprising a memory to store computer-executable instructions and a processor that executes the computer-executable instructions. The server computing device receives, from a contact center, a set of attributes for an incoming call. The server computing device searches, using an elastic search scoring algorithm, an elastic search index of agent attribute JSON documents to find a match (e.g., the best match) of the call attributes as compared with the agent attributes. The server computing device receives, from the elastic search database, a document(s) (e.g., a JSON document) that meets (e.g., best meets) the Lucene Practical Scoring Function criteria for the set of attributes presented. If one or more agent documents are identified, the server computing device: (i) selects a target agent based on length of availability determined from a timestamp in the agent's JSON document, (ii) sets a status of the target agent to busy (in the agent's JSON document), and (iii) routes the call to the target agent (e.g., to a queue of the target agent). If no agents are identified, the server computing device (i) writes call attributes to the call attribute (or KVP) database; (ii) returns a call treatment rule to Connect call flow; and (iii) routes the call to a customer waiting queue.

In another aspect, there is a computerized method of routing calls. The method can include the following steps. First, a server computing device receives, from a contact center, a set of attributes for an incoming call. Second, the server computing device formulates a query to search using an elastic search function and Lucene Practical Scoring Function, an elastic search index to find a match (e.g., the best match) of the call attributes as compared with the agent attributes included in the elastic search index (e.g., contained in JSON documents). A conditional search may be used, which can include "MUST" and/or "SHOULD" match conditions applied to selected attributes. Examples include that the agent MUST be available (agent_status=available) or the customer dialed number MUST be 8005551212 OR 8005551213.

In another aspect, there is a computerized method of routing calls. The method can include the following steps. First, a server computing device receives, from a contact center, a set of attributes for an incoming call. Second, the server computing device formulates a query to search using an elastic search function and Lucene Practical Scoring Function, an elastic search index to find a match (e.g., the best match) of the call attributes as compared with the agent attributes included in the elastic search index (e.g., contained in JSON documents). Third, "coordination scoring" may be used to normalize the count of queries matching between the call attributes and agent attributes. For example, if a call has 100 attributes and it matches 6 attributes with agent 1 and 10 attributes with agent 2, agent 2 would have a higher score.

In another aspect, there is a computerized method of routing calls. The method can include the following steps. First, a server computing device receives, from a contact center, a set of attributes for an incoming call. Second, the server computing device formulates a query to search using an elastic search function and Lucene Practical Scoring Function, an elastic search index to find a match (e.g., the best match) of the call attributes as compared with the agent attributes included in the elastic search index (e.g., contained in JSON documents). Third, "boost scoring" can be specified for an attribute in the query to give it higher priority than other attributes. For example, if a call matches the same number of attributes in both agents, the score will be enhanced for boost attributes that have been matched.

In another aspect, there is a computerized method of routing calls. The method can include the following steps. First, a server computing device receives, from a contact center, a set of attributes for an incoming call. Second, the server computing device formulates a query to search using an elastic search function and Lucene Practical Scoring Function, an elastic search index to find a match (e.g., the best match) of the call attributes as compared with the agent attributes included in the elastic search index (e.g., contained in JSON documents). Third, a fuzzy text search match based on the Levenshtein algorithm for single character differences can be employed. Through the naming of call attributes, the approach can duplicate common routing escalation strategies in use today. For example, selecting the attribute customer_value with values low, medium, and high are poor choices for the Levenshtein algorithm. Instead, selecting high, higher, and highest the number of one-character changes for high and higher would be 2, for higher and highest would also be 2, and for high and highest would be the greatest at 3. So, a call for customer_value=highest would be most likely to target expand to an agent with a "higher" attribute than a "high" attribute.

In one aspect, the invention features a computerized method of routing calls. A server computing device receives a set of call attributes associated with an incoming call. The server computing device identifies, based on the returned document(s), a set of suitable agents having the highest score. In the case of tied scores, the server computing device then queries the agent_status_timestamp of each agent to determine the longest available agent and routes the call to that agent. The server computing device then updates the applicable attributes in the agent JSON document such as the agent_status to "busy" so that the agent is not targeted for any calls until this call is completed.

In some embodiments, the search index is accessible via one or more secure representational state transfer (REST) application programming interfaces (APIs). In some embodiments, the search index is accessible by more than one contact center or vendor. In some embodiments, the server computing device (i) performs a speech-to-text operation on speech received during the incoming call, thereby generating a text file, and (ii), generates, based on the text file, one or more key value pairs (KVPs) associated with the incoming call.

In some embodiments, when an agent enters an available, the server computing device queries a call attribute database to determine whether any calls in the customer waiting queue match the newly available agent's attributes. This is accomplished by a lambda function that queries all calls in queue against the newly available agent's JSON document in Elastic Search. The queued call producing the highest score will be routed to the agent or as a secondary measure in the case of a tie, has been in the customer waiting queue for the longest time.

The above aspect can include one or more of the following features. In some embodiments, the system includes a contact center in electronic communication with the server computing device. In some embodiments, the system includes a representational state transfer (REST) application programming interface (API) in electronic communication with the server computing device. In some embodiments, the system includes a contact (call or text) attribute database in electronic communication with the server computing device, an agent attribute database in electronic communication with the server computing device, and an Elastic Search index in electronic communication with the server computing device. In some embodiments, the server computing device includes multiple software application functions for retrieving additional key value pair (KVP) values for an authenticated caller, In some embodiments, the server computing device includes a contact center call flow function. In some embodiments, the server computing device includes call treatment for calls on hold. In some embodiments, the server computing device includes a processing function configured to store the caller KVPs when no agents are available. In some embodiments, the server computing device includes a real-time data processing function configured to monitor when agents become available. In some embodiments retrieving the KVPs when an agent becomes available and routing the call with the best match that agent.

Figure 15:
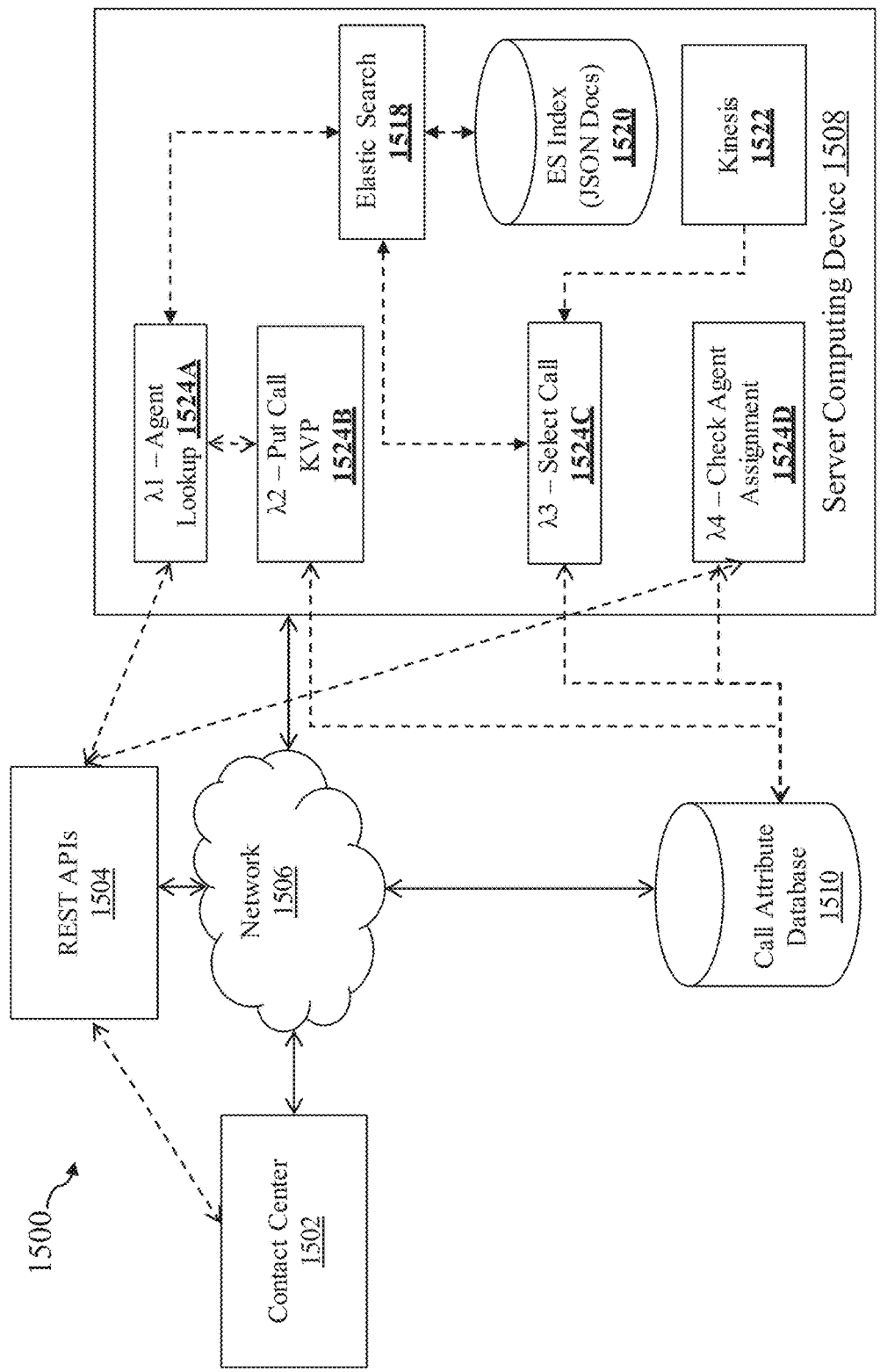
FIG. 15 is a block diagram of a system for routing calls, according to an illustrative embodiment of the invention.

For example, FIG. 15 is a block diagram of a system 1500 for routing calls, according to an illustrative embodiment of the invention. The system 1500 includes a contact center 1502 (such as Genesys or Connect) with a call flow function, a REST API 1504 to expose the computing service, a network 1506 (e.g., an electronic communications network), a server computing device 1508, and a call attribute (e.g., key value pair (KVP)) database 1510. The server computing device 1508 includes a search function 1518 (e.g., Amazon Elastic Search), a document database 1520 for storing documents representing agent attributes (e.g., an AWS managed EC2 database of JSON documents), a real-time data processing function 1522 (e.g., AWS Kinesis), and four software application functions (e.g., AWS lambda functions), 1524A, 1524B, 1524C, and 1524D for looking up KVP values in ES, storing KVPs, selecting a call, and targeting a call, respectively, as described in greater detail below. Document database 1520 can be internal or external to the server computing device 1508.

The contact center 1502 initially answers the customer's call and performs call flow functions such as playing automated, pre-recorded prompts, collecting information about the purpose of the call, and/or authenticating the customer. The contact center 1502 connects to the server computing device 1508 via the network 1506. The network 1506 can be a wide area network, such as the Internet and/or a cloud network. In some embodiments, the network 1506 is comprised of several discrete networks and/or sub-networks (e.g., cloud to Internet). The server computing device 1508 can be a device including specialized hardware and/or software modules that execute on a processor and interact with memory modules of the server computing device 1508, to receive data from other components of the system 1500, transmit data to other components of the system 1500, and perform functions for call routing as described herein.

The databases 1510 are computing devices (or in some embodiments, all one computing device, or each a set of computing devices) coupled to the server computing device 1508 and are configured to receive, generate, and store specific segments of data as described herein. In some embodiments, all or a portion of the database 1510 can be integrated with the server computing device 1508 or be located on a separate computing device or devices. The database 1510 can comprise one or more databases configured to store portions of data used by the other components of the system 1500.

In one embodiment, agent attributes can be formulated and expressed as JSON documents and loaded into an Elastic Search (ES) index 1520. An example document is shown below in greater detail in connection with FIG. 17A. In some embodiments, there are thousands of agents (e.g., 10,000-20,000) online at any given time, with a fraction of those agents servicing a customer at any given time. Elastic search is capable of returning a list of the best matches according to computed conditional and word similarity scores. Elastic search can perform multiple searches in parallel. In some embodiments, one method to speed up the search is to create multiple copies of the data (e.g., across different servers—called primary and "replica" servers)—a process called "sharding."

When a call arrives, it moves into an entry point in the contact center 1502. The customer navigates IVR, and KVPs are attached to the call in the process. In some embodiments, Amazon Lex can be used to perform speech-to-text operations and generate call KVPs for each inbound call based on the associated customer's input. If the customer requests an agent, a call flow in Contact Center 1502 invokes a REST API call in 1504 to initiate the ES Lookup function 1524A (Lambda 1) to find one or more agents in ES corresponding to the call KVPs. Lambda 1 is responsible for querying ES using requests (e.g., posting an API call). The agent profile data is stored in JSON format in 1520, where each JSON object represents a different agent or variation of the attributes. Lambda 1 returns an ES document of an agent in an Available state with the best score containing a unique agent identifier (agent ID) to the initiating call flow in 1502. Lambda 1 then sets the selected agent's status to busy. Connect then directs the call to the agent (or the target agent's queue). If no agent is available, Lambda 2 function 1524C then writes call attributes to the call attribute database 1510. The call treatment is then returned to Contact Center 1502, and the call is moved to the customer waiting queue.

When an agent enters into a "ready" state, Kinesis 1522 detects the event and triggers the "Select Call" function 1524C (Lambda 3). Lambda 3 queries the call attribute database 1510 to see if any calls are in the queue. If there are one or more calls in queue, Lambda 3 runs all the calls in queue against the ready agent's attributes using Elastic Search to determine the call with the highest score and whether that score is above the minimum. Lambda 3 then marks the selected call as "assigned" and changes the status of the agent to busy. The queue call flow running in the Contact Center 1502 periodically invokes a REST API to query the Check Agent Assignment Lambda 4 to determine if an agent has been assigned to a call in queue. If it finds any, it moves the call to the targeted agent's queue.

Figure 16:
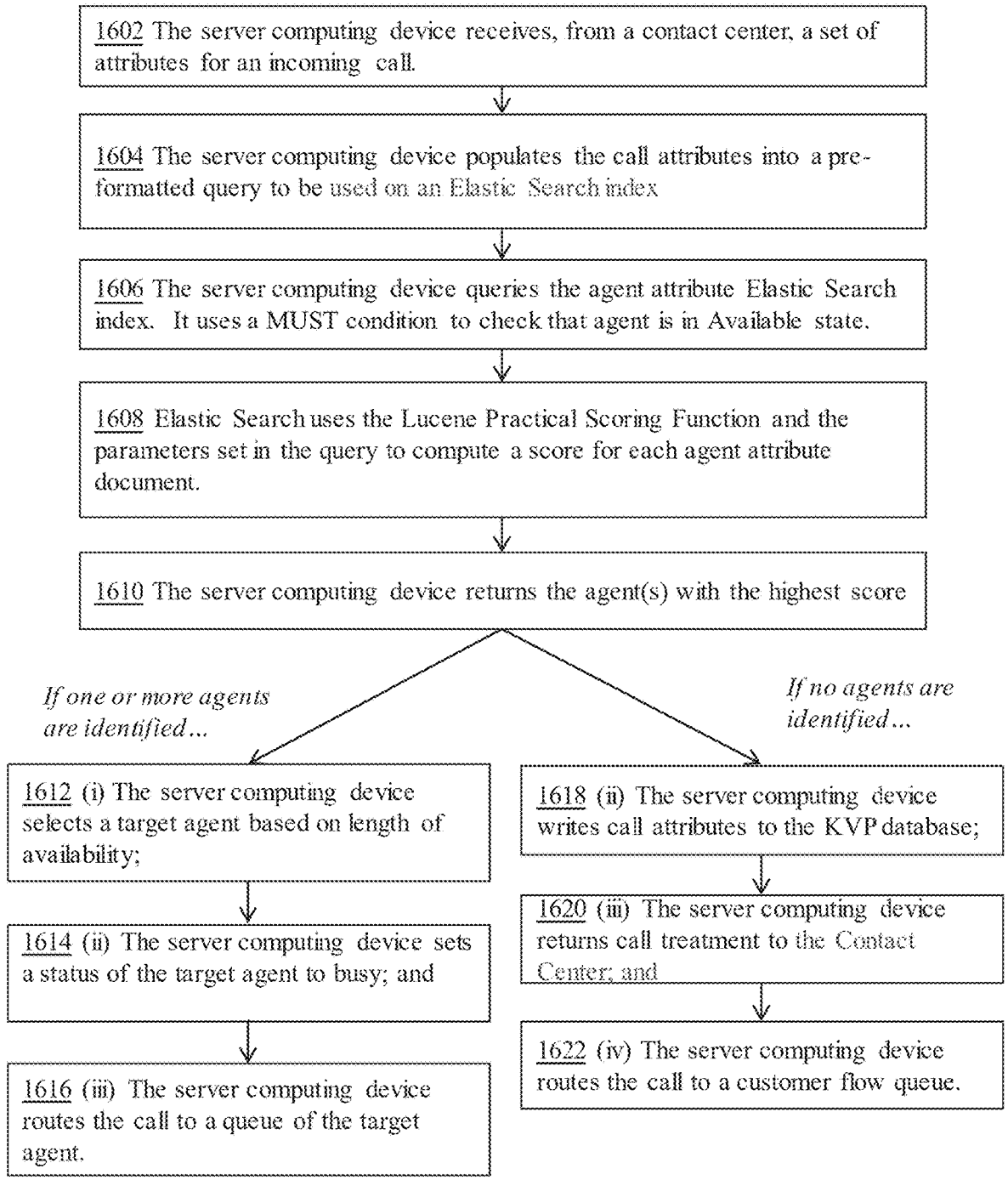
FIG. 16 is a flow diagram of a computerized method of routing calls, according to an illustrative embodiment of the invention.

FIG. 16 is a flow diagram of a computerized method 1600 of routing calls (e.g., using the system 1500 of FIG. 15), according to an illustrative embodiment of the invention. In a first step 1602, a server computing device receives, from a contact center, a set of attributes (KVPs) for an incoming call. In a second step 1604, the server computing device populates the call attributes into a pre-formatted query to be executed against an Elastic Search index. In a third step 1606, the server computing device searches, using an elastic search function and word matching criteria, an elastic search index to find a match (e.g., the best match) of the call attributes as compared with the agent attributes included in the elastic search index (e.g., contained in JSON documents). A conditional search may be used, which can include "must" and/or "should" match conditions applied to each attribute. In the fourth step 1608, additional functionality already contained in Elastic Search such as the use of "coordination" "fuzzy search," and "boosting" an attribute can also be used. The results of these algorithms are combined using the Lucene Practical Scoring Function. In the fifth step, 1610, the server computing device retrieves from the elastic search database, a document (e.g., a JSON document) that meets (e.g., best meets) the criteria for the set of attributes presented. This document includes an agent identifier, agent indicative data, and an agent_status_timestamp indicating the time the agent went ready. If one or more agents are identified with the same score, the server computing device: (i) selects a target agent based on length of availability (step 1612); (ii) sets a status of the target agent to busy (step 1614); and (iii) routes the call to the target agent (e.g., to a queue of the target agent) (step 1616). If no agents are identified, the server computing device (i) writes call attributes to the call attribute (or KVP) database (step 1618); (ii) returns call treatment to Connect (step 1620); and (iii) routes the call to a customer waiting queue (step 1622).

FIG. 17A is an illustration of an agent JSON document 1710, according to an illustrative embodiment of the invention. The JSON document 1710 includes several attributes, such as the Dialed Number corresponding to the phone number the customer dialed. The Appointment_Type attribute indicates that this caller selected one of the following options (cancel, make, reschedule) by voice or DTMF in the IVR phone tree. The document includes the desired Customer_Value this agent will handle, whether they handle customers that call when they are already online, along with indicative data such as the languages the agent speaks.

FIG. 17B is an illustration of another agent JSON document 1720, according to an illustrative embodiment of the invention. The JSON document 1720 include similar information as the prior agent. The primary differences are one agent handles new appointments and the other canceled appointments. The second agent is also a Spanish speaker.

FIG. 17C is an illustration of a search query 1730, according to an illustrative embodiment of the invention. The search query 1730 includes conditional search statements that "must". "must not" or "should" match the call attributes. All "must" and "must not" statements must be identical matches. "Should" statements are not necessary to match, but will trigger the Lucene word matching algorithm that will factor into the elastic search score. The "sort" statement will order the results in descending order by the timestamp of when the agent became available.

Figure 18:
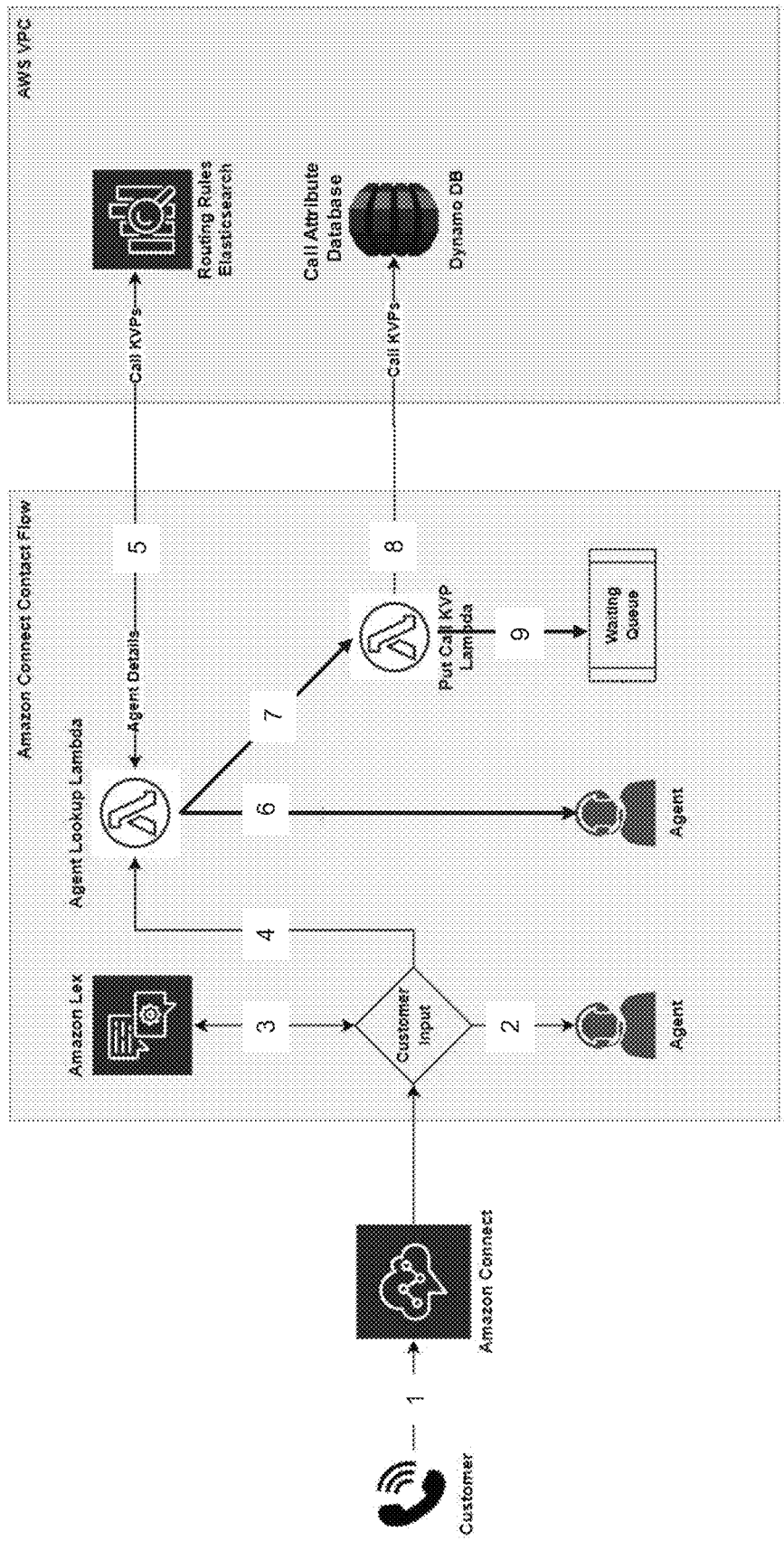
FIG. 18 is a flow diagram of a computerized method of routing calls to available agents, according to an illustrative embodiment of the invention.
Figure 19:
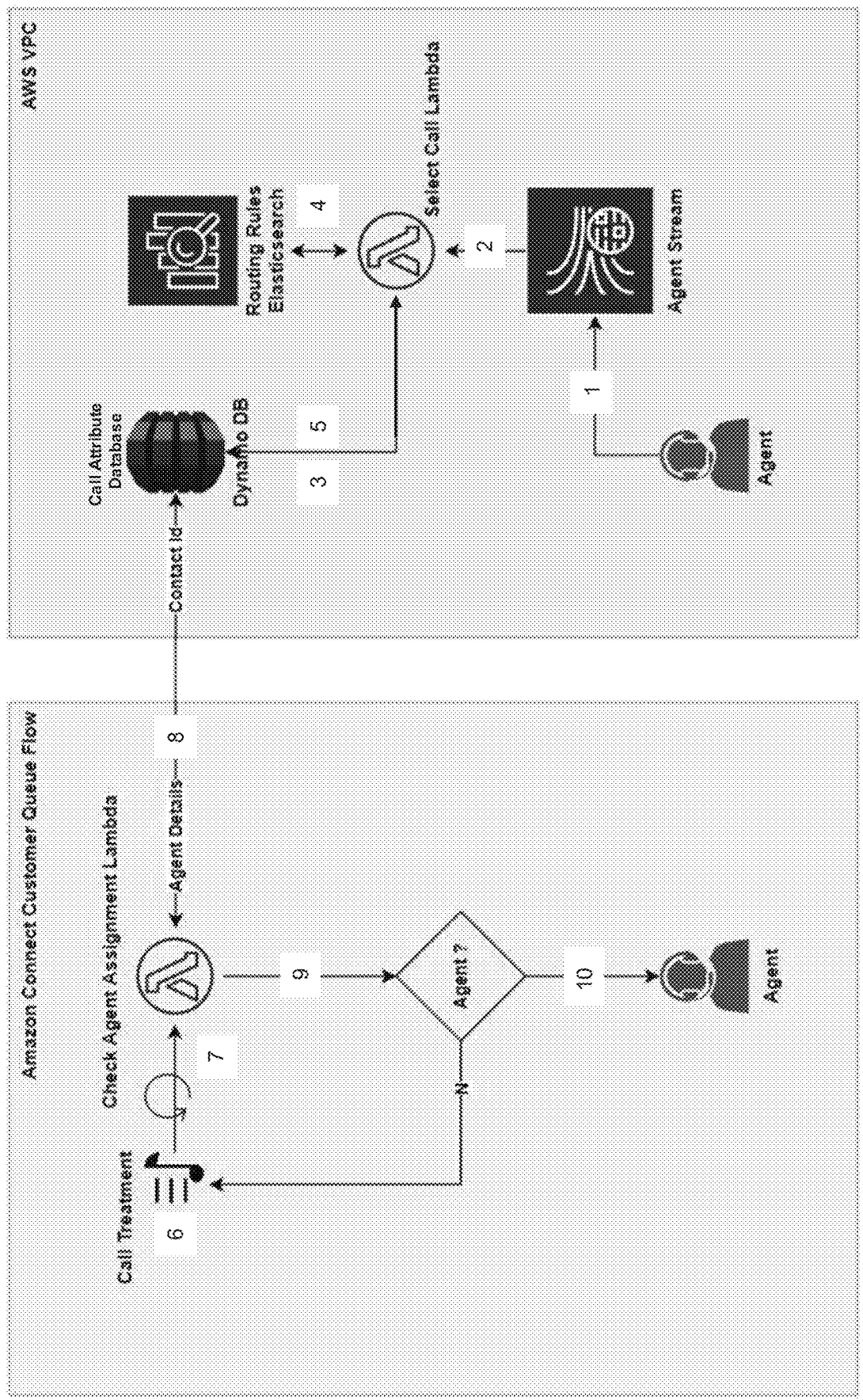
FIG. 19 is a flow diagram of a computerized method of matching a newly available customer agent with a target customer call, according to an illustrative embodiment of the invention.

FIGS. 18-19 show steps that can be executed on the system shown in FIG. 15 together with additional sequencing details that may be understood in this alternative visual representation. Steps are denoted by numbers on the figure. FIG. 18 is a flow diagram of a computerized method 1800 of routing calls, according to an illustrative embodiment of the invention. In step 1, a customer call is received by a contact center system (e.g., Amazon Connect) and moves to a Call Flow entry point. In some embodiments, the customer is asked to enter his or her advisor's phone extension or remain on the line for the next available agent. Step 2 assumes the desired advisor is available and the call is routed to that agent. If the customer's advisor is unavailable, the customer can be given an option to leave a voicemail message. In step 3, if the customer stays on the line, the customer is asked to provide customer input (e.g., to state the purpose of the call). A speech-to-text computing module (e.g., Amazon Lex) may perform speech-to-text recognition on the customer's speech to determine the intent of the call. The call intent and the dialed number can constitute the KVPs of the incoming call. In step 4, a call flow function (e.g., the call flow function of Amazon Connect) invokes the Agent Lookup lambda function. In step 5 the Agent Lookup lambda function queries ES to match the KVPs against the agent attributes. ES then returns the agent attributes document which is then returned to Contact Flow which targets the desired agent in step 6. If ES is not able to target an agent in an Available state, the Contact Flow writes the call attributes in the call KVP dynamo database in step 8 and transfers the call to a waiting queue in step 9. In some embodiments built in Genesys, the Genesys workflows call the Rest API with incoming call KVPs as a request body. The Rest API is a front end to an Agent Lookup lambda function, which receives the input, forms an ES query and returns the output to Genesys. In this case, the output is the set of KVPs that is required to handle the call. Genesys makes use of those returned KVPs to transfer the call to the desired agent.

FIG. 19 is a flow diagram of another computerized method of (i) matching a newly available customer agent with a target customer call with a queued call experiencing call treatment (aka hold music). In step 1, the live data streaming function (e.g., Amazon Kinesis) detects any changes in the status of each agent in the system When the agent becomes available, the live data streaming function invokes a Select Call lambda function in step 2. In step 3, the Select Call lambda function retrieves the call attributes of every queued call in the Call Attribute database. In some instances, there may be no calls queued and the procedure would stop. In step 4 the Select Call lambda will now create the search query for every queued call and execute the Elastic Search match against the attributes of the single agent that went available. The call with the highest score (above the minimum) is selected and in step 5 that agent's corporate ID or the agent's elastic search document ID is written into the record of that call's unique contact ID in the Call Attribute Database. If there is a match, the Select Call lambda function dynamically updates the agent's attribute information and changes the agent's status to "busy."

FIG. 19 also shows the queue flow in Amazon for a call on hold waiting for an agent to become available. In step 6, the customer is treated in a waiting queue by a set of prompt files and treatment music. In step 7, the customer queue flow invokes a Check Agent Assignment lambda function at a periodic interval (e.g., every five seconds). In step 8 this lambda function queries the call KVP dynamo database to look for any agent assignment to the call. The input provided for the query in step 1 can be a unique call contactID. In some embodiments, the call KVP dynamo database is scanned as soon as an agent becomes available by the same triggering event initiated by the Agent stream in step 2. In step 9, the customer queue flow checks for the output returned. If it receives the agent information, it transfers the call to the associated agent in step 10 (e.g., the agent shown). An output with a null value makes the customer continue to wait in the queue.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed on premise or in a cloud computing environment (e.g., Amazon® AWS).

Method steps can be performed by one or more processors executing a computer program to perform functions of the invention described herein by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method of routing calls, the computerized method comprising:
   receiving, by a server computing device, a set of call attributes represented by one or more key value pairs (KVPs) and associated with an incoming call;
   generating, by the server computing device, a text-based query based on the one or more KVPs and a plurality of conditions for matching the one or more KVPs;
   executing, by the server computing device, the query against a database of electronic documents containing agent specific data associated with a plurality of call attribute types that an agent is skilled to handle;
   scoring, by the server computing device, an optimal match from a set of available agents based on the text-based query and the database of electronic documents using a Lucene Practical Scoring Function;
   generating, by the server computing device, an agent document corresponding to a target agent of the set of available agents based on longest available criteria, the agent document comprising agent indicative data; and
   routing, by the server computing device, the incoming call to: (i) the target agent in the set of available agents if available; or (ii) or a customer waiting queue, if there is no suitable agent in the set of available agents.

2. The method of claim 1, further comprising:
   if one or more suitable agents are identified:
      selecting, by the server computing device, a target agent based at least in part on length of availability;
      setting, by the server computing device, a status of the target agent to busy; and
      routing, by the server computing device, the call to the target agent; or
   if no agents are identified:
      determining, by the server computing device, whether any agents are staffed;
      writing, by the server computing device, call attributes to a call attribute database in electronic communication with the server computing device; and
      returning, by the server computing device, a call treatment rule for treating the incoming call while in the customer waiting queue.

3. The method of claim 1, wherein the plurality of conditions for matching the one or more KVPs comprises at least one required condition.

4. The method of claim 1, wherein generating the agent document includes scoring available agent documents and selecting the agent document having the highest score.

5. The method of claim 1, wherein the set of call attributes comprises at least one of a dialed phone number, one or more caller selections made during an IVR selection process, a customer originating phone number (ANI), and a call arrival time.

6. The method of claim 1, wherein the set of call attributes comprises at least one of a unique identifier of the caller, customer profile information, customer historical information, and customer preferences.

7. The method of claim 1, wherein scoring the optimal match is based on an Elastic Search coordination feature that provides a higher score based on the total number of attributes matched.

8. The method of claim 1, wherein scoring the optimal match is based on an Elastic Search boosting feature that provides a higher score to a specific attribute over other attributes that match.

9. The method of claim 1, wherein scoring the optimal match is based on an Elastic Search fuzzy search feature which uses the Levenshtein one-character change distance measure for computing text-based differences.

10. The method of claim 1, wherein the Lucene Practical Scoring Function combines scores of disparate Elastic Search capabilities into a single score.

11. The method of claim 1, wherein the plurality of conditions for matching the one or more KVPs comprises one or more call associated data values.

12. The method of claim 1, wherein the server computing device is configured to send the one or more KVPs to a search index to determine a set of agent skills to target.

13. The method of claim 12, wherein the search index is accessible via one or more secure representational state transfer (REST) application programming interfaces (APIs).

14. The method of claim 12, wherein the search index is accessible by more than one contact center or vendor.

15. The method of claim 1 further comprising, (i) performing, by the server computing device, a speech-to-text operation on speech received during the incoming call, generating a text file corresponding to the speech received during the incoming call, and (ii), generating, by the server computing device, based on the text file, the one or more KVPs associated with the incoming call.

16. The method of claim 1, wherein when an agent enters a ready state, the server computing device queries a call attribute database to determine whether any calls in the customer waiting queue match the newly available agent's attributes.

17. A system for routing calls comprising:
   a server computing device comprising a memory to store computer-executable instructions and a processor that executes the computer-executable instructions, the server computing device configured to:
      receive a set of call attributes represented by one or more key value pairs (KVPs) and associated with an incoming call;
      generate a text-based query based on the one or more KVPs and a plurality of conditions for matching the one or more KVPs;
      execute the query against a database of electronic documents containing agent specific data associated with a plurality of call attribute types that an agent is skilled to handle;

score an optimal match from a set of available agents based on the text-based query and the database of electronic documents using a Lucene Practical Scoring Function;

generate an agent document corresponding to a target agent of the set of available agents based on longest available criteria, the agent document comprising agent indicative data; and route the incoming call to: (i) the target agent in the set of available agents if available; or (ii) or a customer waiting queue, if there is no suitable agent in the set of available agents.

18. The system of claim 17, wherein the server computing device is configured to score the optimal match based on an Elastic Search coordination feature that provides a higher score based on the total number of attributes matched.

19. The system of claim 17, wherein the server computing device is configured to score the optimal match based on an Elastic Search boosting feature that provides a higher score to a specific attribute over other attributes that match.

20. The system of claim 17, wherein the server computing device is configured to score the optimal match based on an Elastic Search fuzzy search feature which uses the Levenshtein one-character change distance measure for computing text-based differences.

* * * * *